(12) United States Patent
Krebs et al.

(10) Patent No.: US 10,571,037 B2
(45) Date of Patent: Feb. 25, 2020

(54) POSITIVE PRESSURE RELIEF VALVE

(71) Applicant: Aurora Flight Sciences Corporation, Manassas, VA (US)

(72) Inventors: Christopher Krebs, Manassas, VA (US); David Kordonowy, Manassas, VA (US); Robert Renshaw, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 7 days.

(21) Appl. No.: 15/946,912

(22) Filed: Apr. 6, 2018

(65) Prior Publication Data
US 2019/0309865 A1   Oct. 10, 2019

(51) Int. Cl.
*F16K 17/06* (2006.01)
*B64D 13/04* (2006.01)
*F16K 31/122* (2006.01)
*F16K 21/16* (2006.01)

(52) U.S. Cl.
CPC ............ *F16K 17/065* (2013.01); *B64D 13/04* (2013.01); *F16K 21/165* (2013.01); *F16K 31/1225* (2013.01); *Y10T 137/7768* (2015.04); *Y10T 137/7782* (2015.04)

(58) Field of Classification Search
CPC ......... Y10T 137/7768; Y10T 137/7769; Y10T 137/777; Y10T 137/7782; F16K 17/0486; F16K 17/168; F16K 31/143; F16K 31/145; B64D 13/04
USPC ............................................. 251/14.319, 321
See application file for complete search history.

(56) References Cited

U.S. PATENT DOCUMENTS

| 683,691 | A | * | 10/1901 | Kramer | G05D 16/103 |
| | | | | | 137/495 |
| 1,147,937 | A | * | 7/1915 | Gleeson | F16K 31/0655 |
| | | | | | 137/495 |
| 3,387,622 | A | * | 6/1968 | Weinstein | F16K 31/145 |
| | | | | | 137/495 |
| 3,678,959 | A | * | 7/1972 | Liposky | A61M 39/223 |
| | | | | | 137/625.11 |
| 4,214,605 | A | * | 7/1980 | Hardgrave | E21B 33/062 |
| | | | | | 137/495 |
| 5,687,759 | A | * | 11/1997 | Tan | F16K 31/402 |
| | | | | | 137/486 |

(Continued)

*Primary Examiner* — Robert K Arundale
(74) *Attorney, Agent, or Firm* — Michael Stanley Tomsa; McAndrews, Held & Malloy, Ltd.; Eugene H. Nahm

(57) ABSTRACT

Disclosed herein is a positive pressure relief valve having a valve assembly, a trigger mechanism, an inlet manual override knob, and an outlet manual override knob. The valve assembly may comprises a valve throat and a main piston positioned at least partially within the valve throat, the main piston configured to selectively open and close the valve throat as a function of a pressure at the inlet to the valve assembly. The valve assembly may comprise a set of throat inserts within the valve throat. The trigger mechanism serves to quickly pressurize the main piston's diaphragm. The trigger mechanism may be positioned in a trigger mechanism housing at the outlet end of the valve assembly. The inlet and outlet manual override knob may be coupled to the main piston and configured to pull or push the main piston, thereby displacing the main piston to open the valve assembly.

20 Claims, 18 Drawing Sheets

(56) References Cited

U.S. PATENT DOCUMENTS

| | | | | |
|---|---|---|---|---|
| 5,944,054 A | * | 8/1999 | Saieva | A62B 9/02 128/201.28 |
| 2010/0018585 A1 | * | 1/2010 | Pavin | F23N 1/005 137/66 |
| 2015/0337524 A1 | * | 11/2015 | Bush | E03B 7/071 73/37 |

* cited by examiner

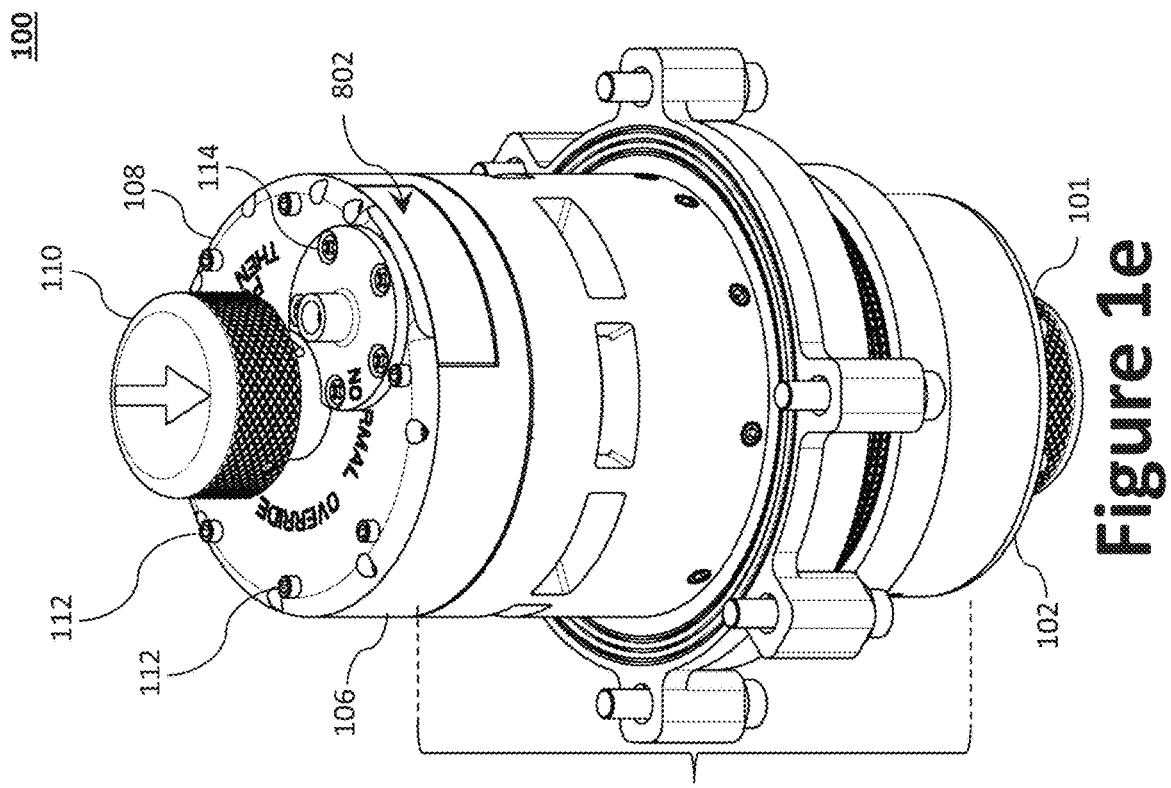
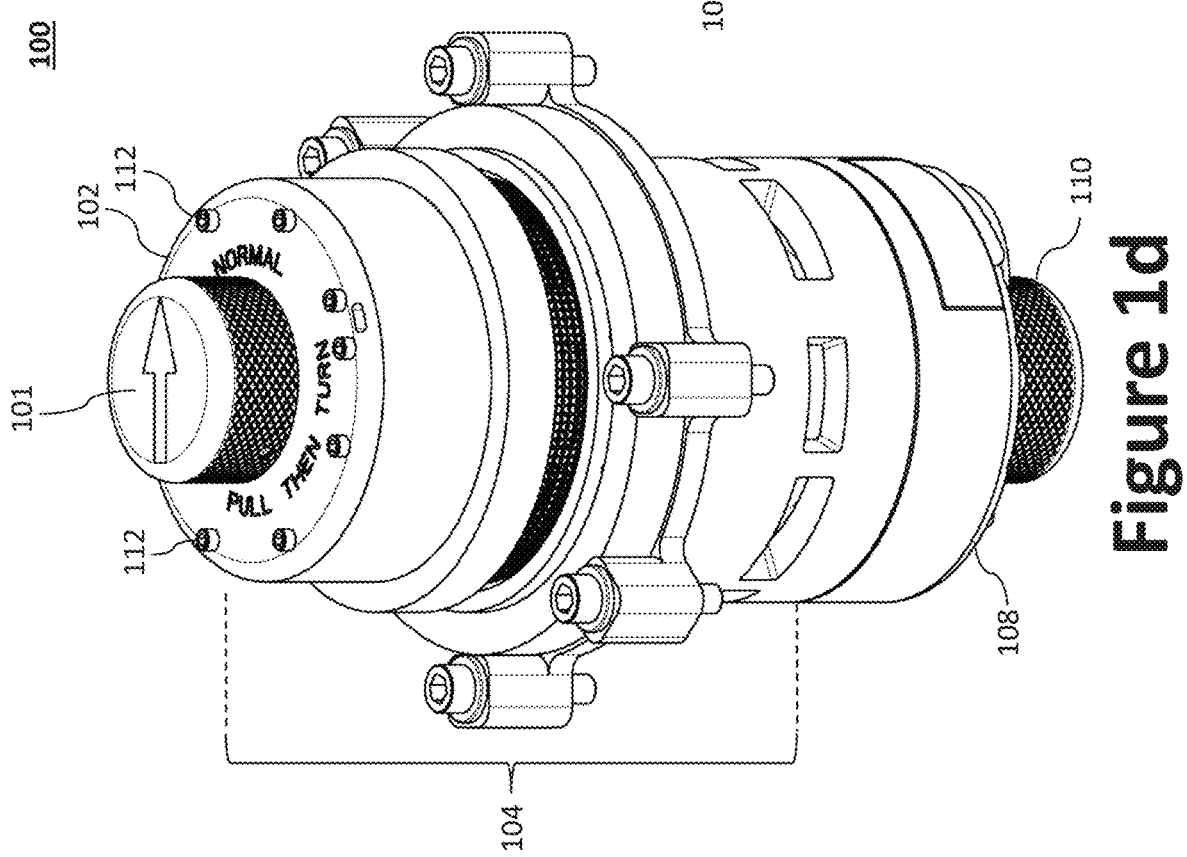

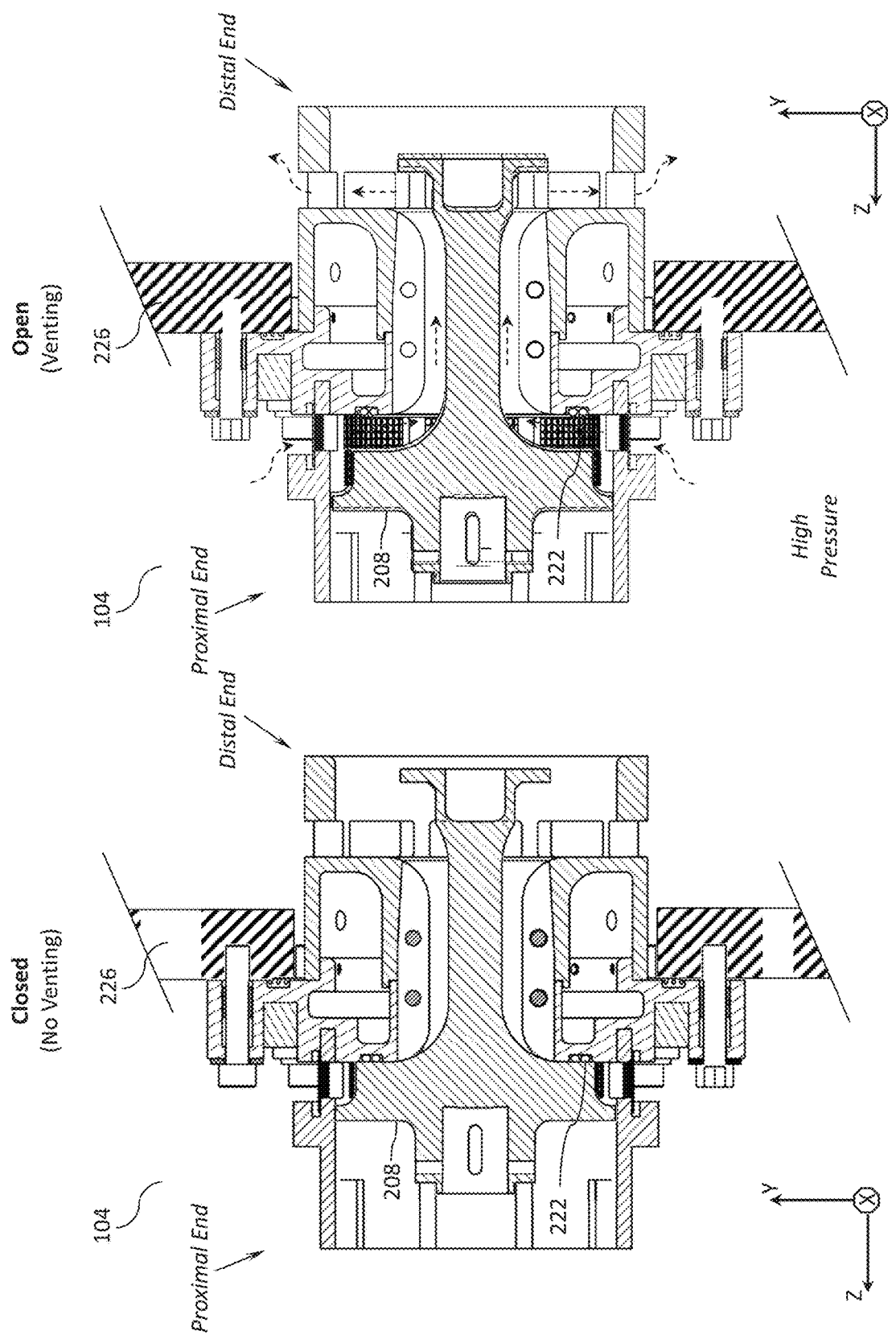

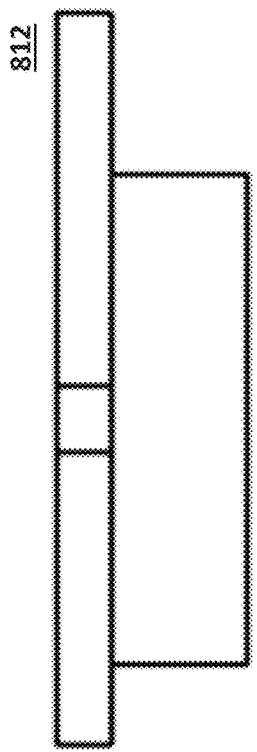
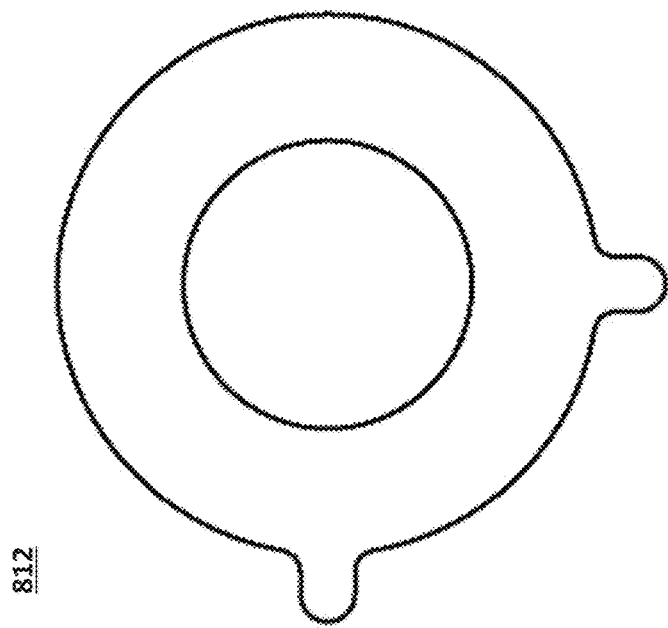
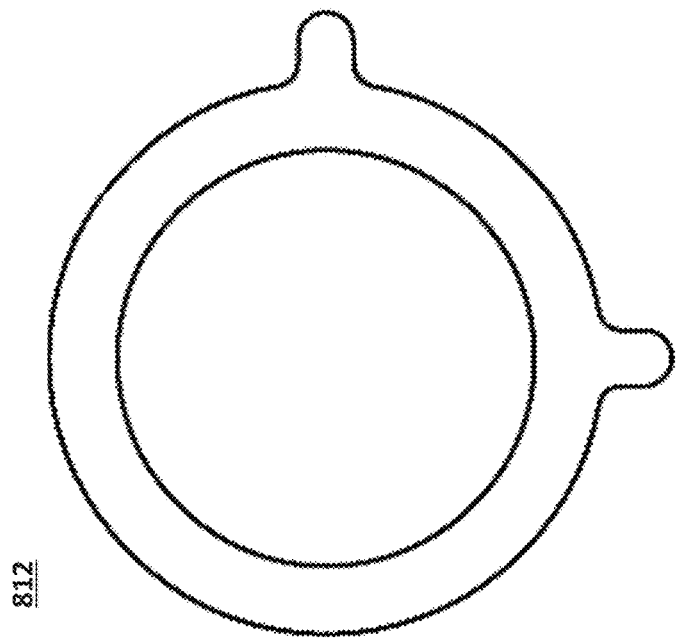

POSITIVE PRESSURE RELIEF VALVE

TECHNICAL FIELD

The present disclosure relates to pressure management, more specifically, to a positive pressure relief valve to relieve pressure from an enclosed space.

BACKGROUND

The trend of humanity to progressively spend more time in space has spurred governmental and private interest to develop spacecraft for both space travel and cargo delivery. For example, Sierra Nevada Corporation (SNC) Space System's Dream Chaser Cargo System (Dream Chaser) is a reusable automated cargo lifting-body spacecraft. The Dream Chaser is designed to resupply the International Space Station with both pressurized and unpressurized cargo. Further development of the Dream Chaser includes a crewed version, which would be capable of carrying up to seven people to and from low Earth orbit. As can be appreciated, such spacecraft are subject to pressure changes as it travels between gravity and microgravity environments (e.g., during liftoff and recovery). A buildup of internal pressure in a spacecraft (or component thereof), however, can cause irreparable structural damage to the spacecraft.

Accordingly, a need exists for system that can prevent this damage by sensing the internal pressure buildup and opening a flow path to outside the vehicle to relieve the pressure. To that end, disclosed herein is a positive pressure relief valve that can quickly sense an internal pressure buildup and, in response, open a flow path to relieve the pressure.

SUMMARY

The present disclosure is directed to pressure management, more specifically, to a positive pressure relief valve to relieve pressure from an enclosed space; more specifically, to a positive pressure relief valve that can quickly sense an internal pressure buildup and, in response, open a flow path to relieve the pressure.

According to a first aspect, a positive pressure relief valve comprises: a valve assembly defining a valve throat between an inlet at an inlet end and an outlet at an outlet end, wherein the valve assembly comprises a main piston positioned at least partially within the valve throat, the main piston configured to selectively open and close the valve throat as a function of a pressure at the inlet, wherein the valve assembly comprises a set of throat inserts within the valve throat; a trigger mechanism to pressurize a diaphragm associated with the main piston to open the valve throat as a function of a pressure at the outlet, wherein the trigger mechanism is positioned in a trigger mechanism housing at the outlet end of the valve assembly; an inlet manual override knob coupled to the main piston, wherein the inlet manual override knob is configured to pull the main piston from the inlet end, wherein pulling the main piston from the inlet end unseats the main piston to vent fluid through the valve throat; and an outlet manual override knob coupled to the main piston, wherein the outlet manual override knob is configured to push the outlet piston from the outlet end, wherein pushing the main piston from the outlet end unseats the main piston to vent fluid through the valve throat.

In certain aspects, the valve assembly comprises an inlet housing, a mounting bracket, and an exit housing.

In certain aspects, the inlet housing define the inlet and the exit housing defines the outlet.

In certain aspects, the mounting bracket defines a first throat portion and the exit housing defines a second throat portion, the first and second throat portions defining the valve throat.

In certain aspects, an outer surface of the set of throat inserts is sized and shaped to correspond to an inner surface of the valve throat.

In certain aspects, the set of throat inserts is sized to reduce flowrate through the valve throat.

In certain aspects, the set of throat inserts is interchangeable.

In certain aspects, the valve throat tapers from the inlet to the outlet.

In certain aspects, a diameter of the valve throat at the outlet end is less than a diameter of the valve throat at the inlet end.

In certain aspects, the trigger mechanism comprises a trigger piston and a trigger spring to bias the trigger piston in a closed position.

In certain aspects, the trigger mechanism comprises a trigger set screw to adjust a pressure at which point the main piston is unseated to open the valve throat.

According to a second aspect, a method of relieving pressure from an enclosed space comprises: providing a valve assembly defining a valve throat between an inlet at an inlet end and an outlet at an outlet end, the valve assembly comprising a main piston positioned at least partially within the valve throat, wherein the main piston is configured to unseat at a predetermined pressure at the inlet, and wherein the valve assembly comprises a set of throat inserts positioned within the valve throat; and providing a trigger mechanism positioned in a trigger mechanism housing at the outlet end of the valve assembly, wherein the trigger mechanism is configured to pressurize a diaphragm associated with the main piston to unseat the main piston at a predetermined pressure at the outlet.

In certain aspects, the main piston is operatively coupled to an inlet manual override knob, wherein the inlet manual override knob is configured to pull the main piston from the inlet end, wherein pulling the main piston from the inlet end unseats the main piston to vent fluid through the valve throat.

In certain aspects, the main piston is operatively coupled to an outlet manual override knob, wherein the outlet manual override knob is configured to push the outlet piston from the outlet end, wherein pushing the main piston from the outlet end unseats the main piston to vent fluid through the valve throat.

In certain aspects, the trigger mechanism comprises a trigger piston and a trigger spring to bias the trigger piston in a closed position.

In certain aspects, the trigger mechanism comprises a trigger set screw to adjust a pressure at which point the main piston is unseated to open the valve throat.

In certain aspects, the set of throat inserts is removable and sized to reduce flowrate through the valve throat.

In certain aspects, the valve assembly comprises an inlet housing, a mounting bracket, and an exit housing.

In certain aspects, the mounting bracket defines a first throat portion and the exit housing defines a second throat portion, the first and second throat portions defining the valve throat.

In certain aspects, the valve throat tapers from the inlet to the outlet.

DESCRIPTION OF THE DRAWINGS

These and other advantages of the present disclosure can be readily understood with the reference to the following specifications and attached drawings wherein:

FIGS. 1a through 1f illustrate an example positive pressure relief valve.

FIGS. 2a through 2d illustrate an example valve internal assembly.

FIGS. 9a through 9e illustrate an example trigger spring plug.

DETAILED DESCRIPTION

Figure 1A:
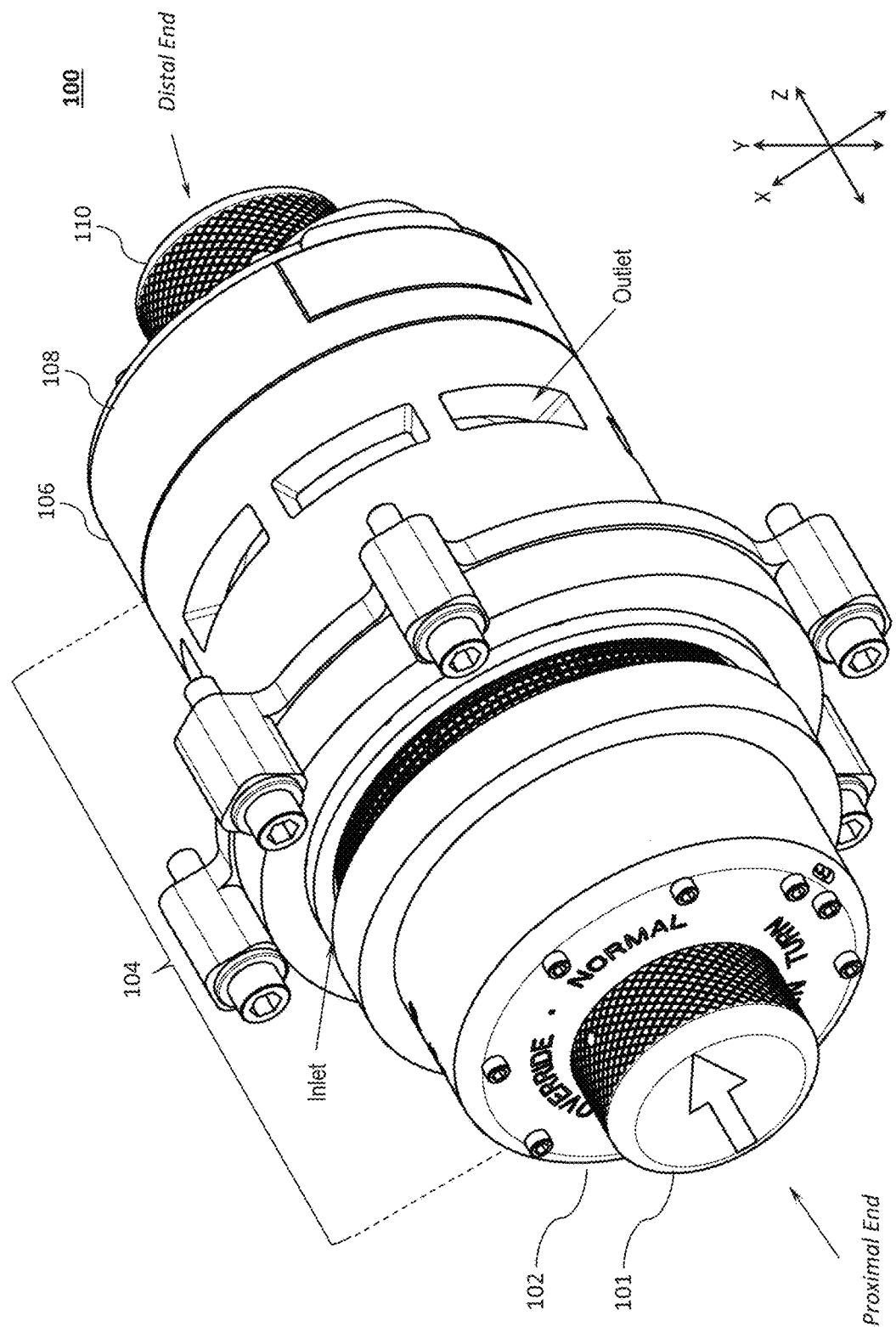

Preferred embodiments of the present disclosure will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments.

The terms "about" and "approximately," when used to modify or describe a value (or range of values), mean reasonably close to that value or range of values. Thus, the embodiments described herein are not limited to only the recited values and ranges of values, but rather should include reasonably workable deviations. Further, as can be appreciated, the various measurements disclosed herein may be scaled up or down depending on the design need without deviating from the scope of the present disclosure.

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y, and z."

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "exemplary" means serving as a non-limiting example, instance, or illustration. Similarly, as utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

The term "fluid," when used as a noun, refers to a free-flowing deformable substance with no fixed shape, including, inter alia, gas (e.g., air, atmosphere, etc.), liquid (e.g., water), and plasma.

The present disclosure is directed to a positive pressure relief valve configured to sense an internal pressure buildup and to open a flow path to relieve the pressure. In certain aspects, the positive pressure relief valve may be a fully pneumatic mechanical device. For example, the fully pneumatic mechanical device may be designed to sense a pressure buildup inside an enclosed volume (e.g., a spacecraft) and to relieve the pressure external to the enclosed volume (e.g., to space, another module, another spacecraft, etc.).

Figure 1B:
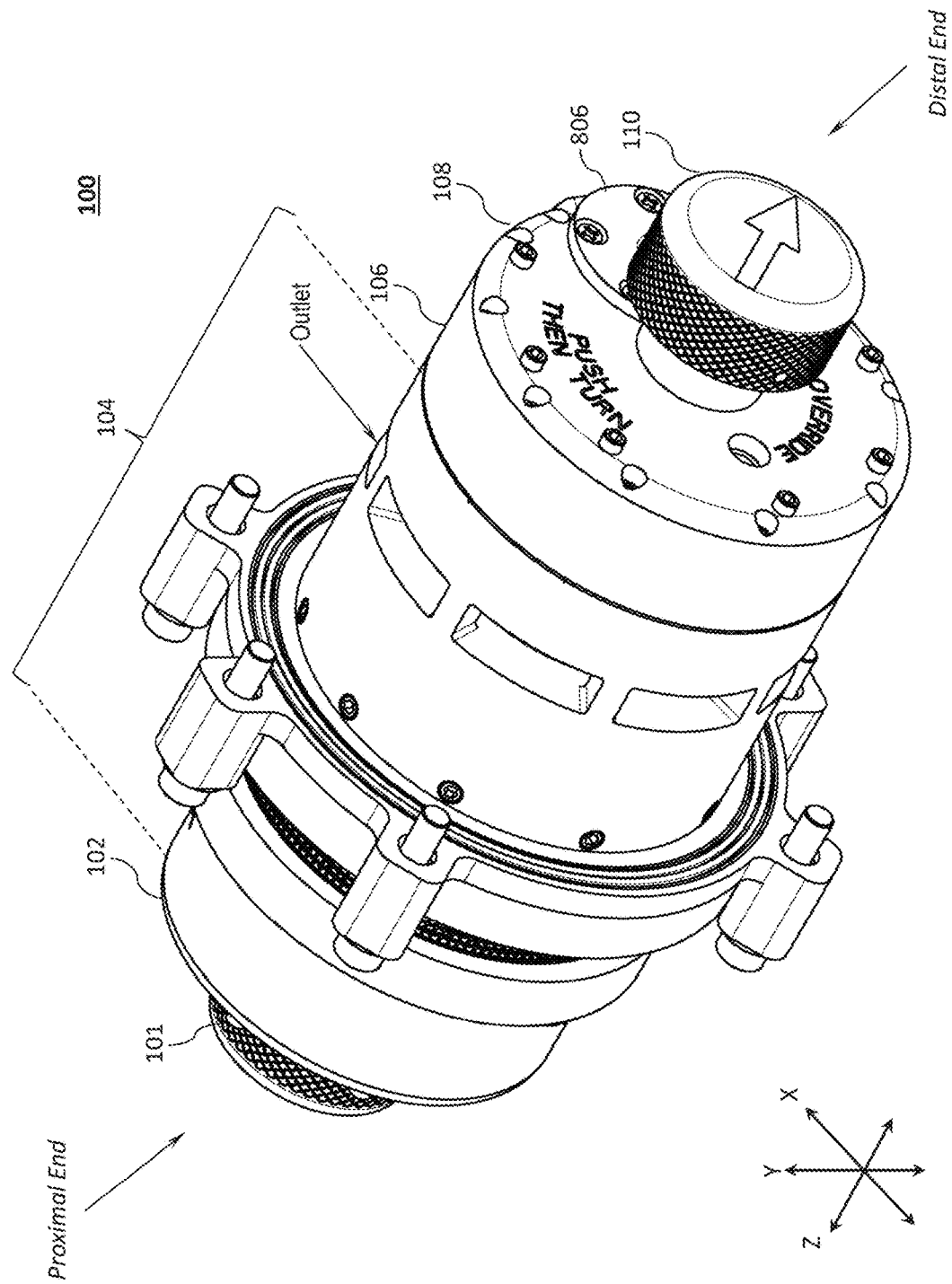
Figure 1C:
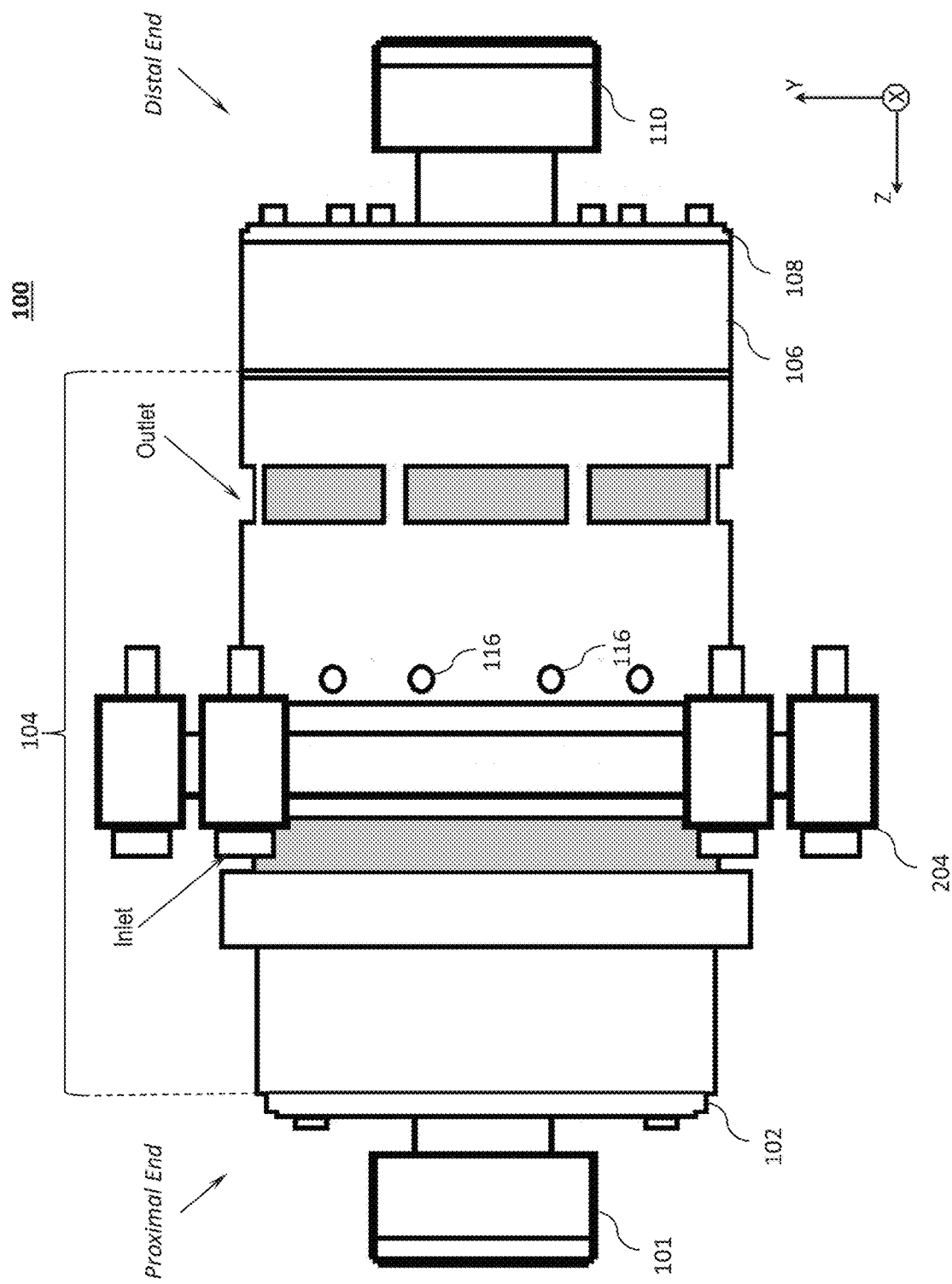
Figure 1F:
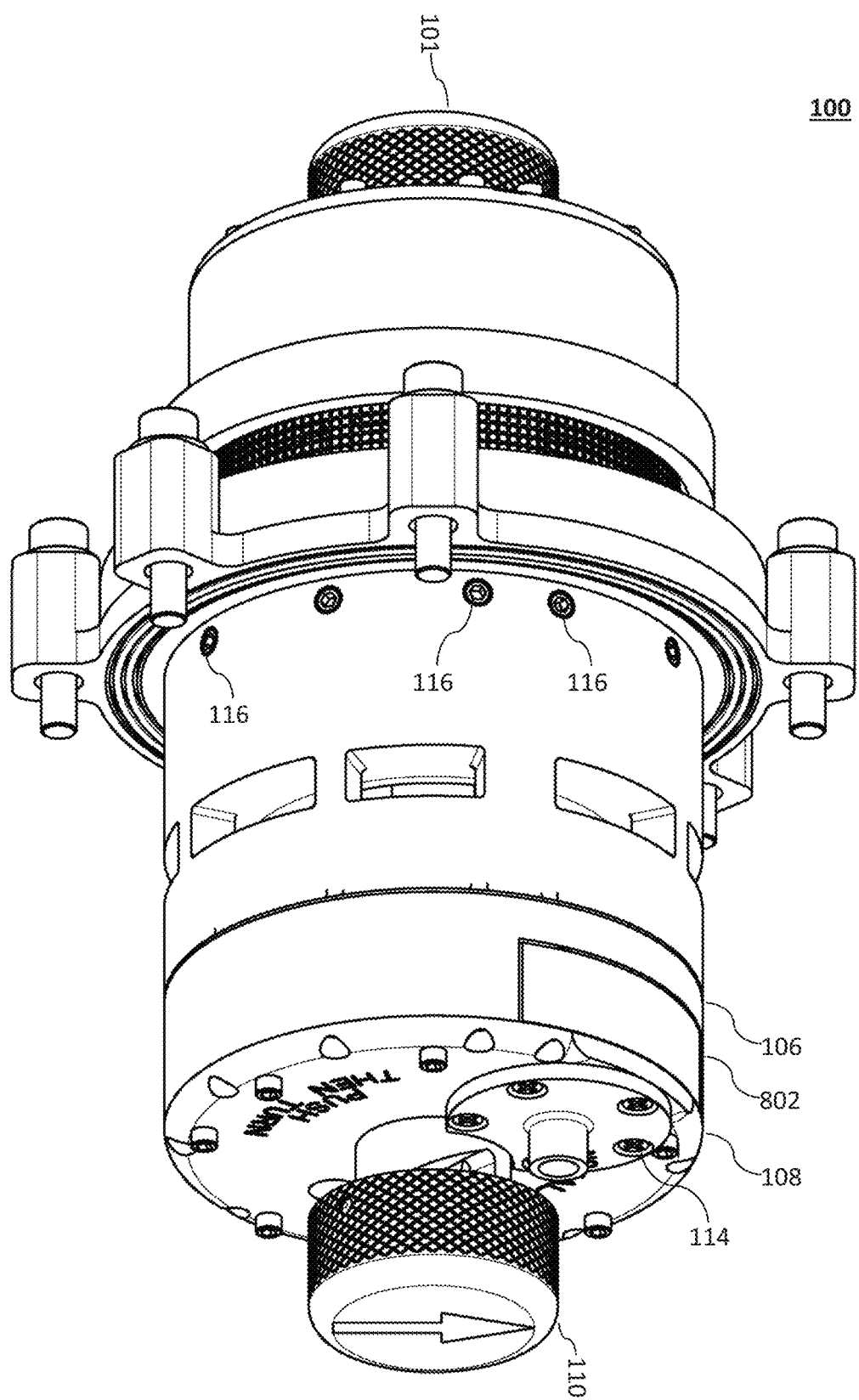
Figure 2A:
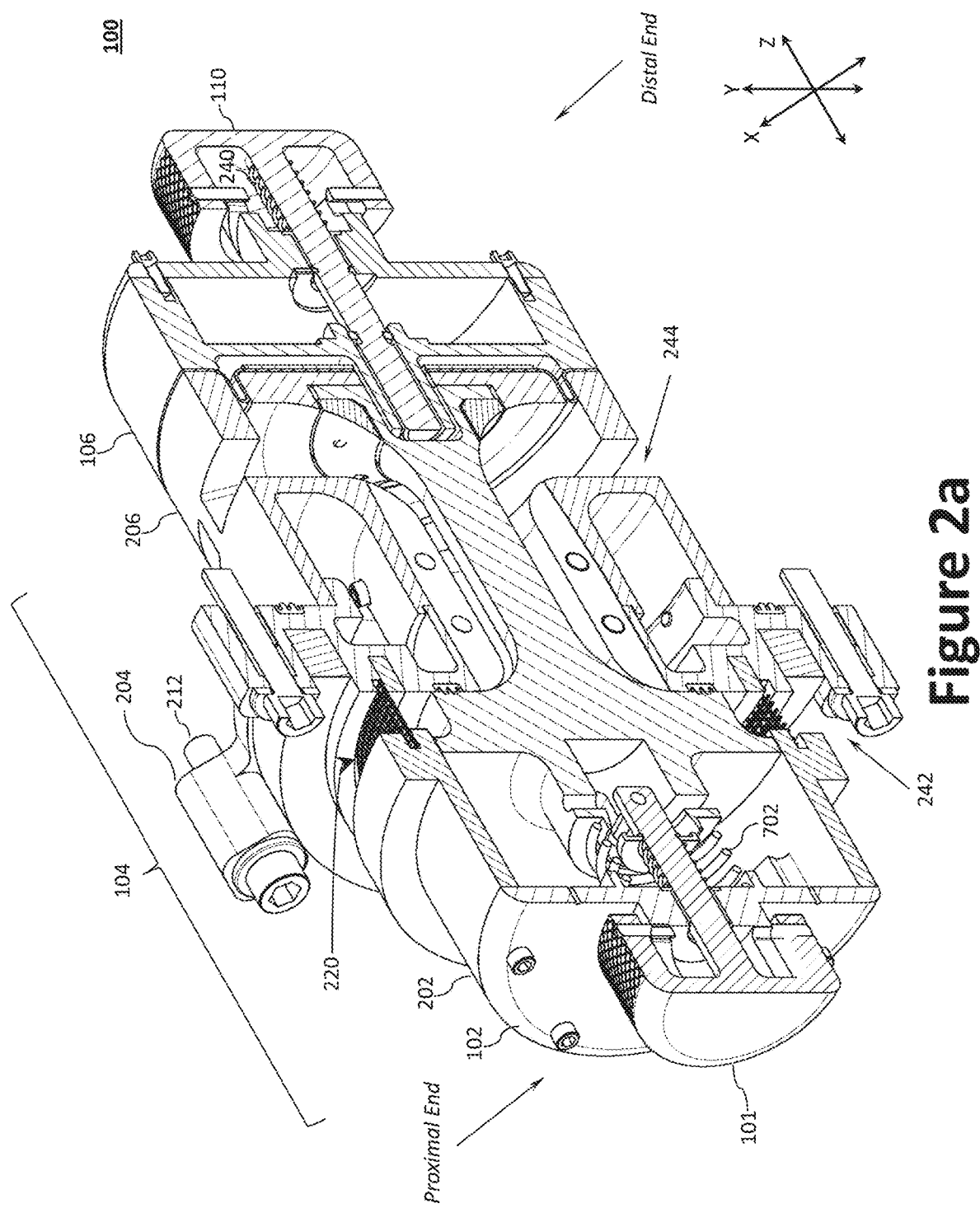
Figure 2B:
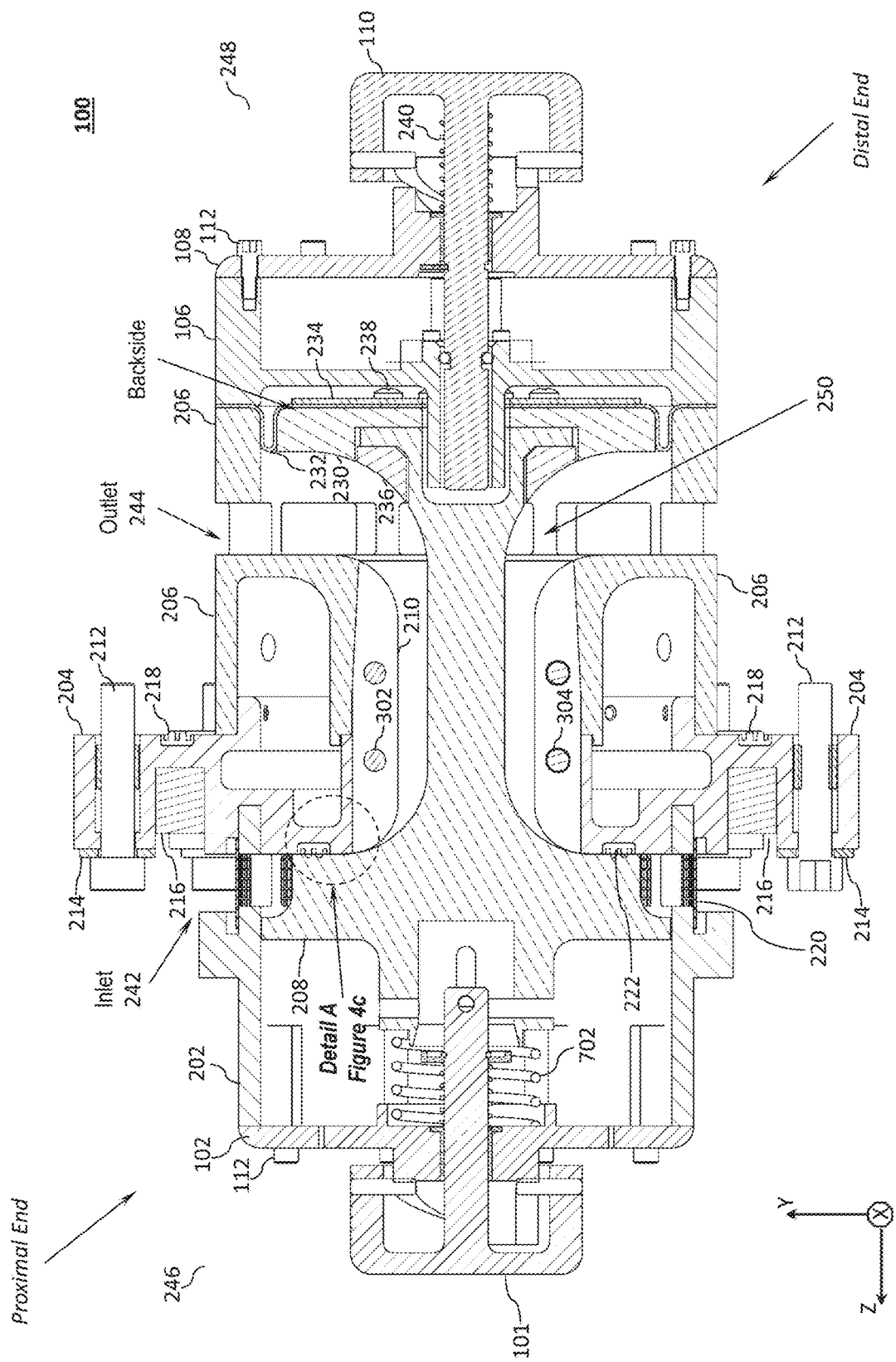

FIGS. 1a through 1f illustrate different views of an example positive pressure relief valve 100 having a proximal end and a distal end. Specifically, FIG. 1a illustrates an isometric side view of the proximal end, FIG. 1b illustrates an isometric side view of the distal end, and FIG. 1c illustrates a side view of the positive pressure relief valve 100. FIG. 1d illustrates an isometric aerial view of the proximal end, while FIG. 1e illustrates an isometric aerial view of the distal end. Finally, FIG. 1f illustrates a bottom perspective view of the valve assembly 104 of the positive pressure relief valve 100.

As illustrated, the positive pressure relief valve 100 generally comprises (starting at the proximal end), an inlet manual override knob 101, an inlet end plate 102, a valve assembly 104, a trigger mechanism housing 106 to house a trigger mechanism (best illustrated in FIGS. 8a through 8c as trigger mechanism 800), an exit end plate 108, and an outlet manual override knob 110. As illustrated, the inlet 242 and outlet 244 may be positioned on each side of the mounting bracket 204 of the positive pressure relief valve 100, which is used to secure the positive pressure relief valve 100 to the spacecraft structure 226 that separates an enclosed volume from another area. Specifically, the inlet 242 may be provided toward the proximal end and situated within the enclosed volume, while the outlet 244 may be provided toward the distal end and situated outside of the enclosed volume.

In operation, the positive pressure relief valve 100 is configured to open to allow internal air from the enclosed volume (e.g., the spacecraft) to escape/vent through the spacecraft structure 226 to outside the enclosed volume once a predetermined pressure level is achieved within the enclosed volume (e.g., a "trigger" level); thereby preventing any additional increase in the internal pressure of the enclosed volume. In other words, the positive pressure relief valve 100 opens (e.g., moves a main piston) to define a fluid-flow path between the inlet end 246 (e.g., first end) and the outlet end 248 (e.g., second end). In certain aspects, the positive pressure relief valve 100 may employ a two-stage design. In a two-stage design, a trigger mechanism 800 can be used to sense the internal pressure of the enclosed volume and, when the predetermined pressure level is reached, the trigger mechanism's trigger piston opens to quickly pressurize the main piston's diaphragm, thereby forcing the main piston to open and provide a flow path between the inlet 242/outlet 244 for the internal gas/air to escape.

The positive pressure relief valve 100 may also incorporate a manual override feature on each side of the positive pressure relief valve 100 (i.e., at both the inlet and exit/outlet ends 246, 248), which can be manually actuated using either the inlet manual override knob 101 and/or the outlet manual override knob 110. The manual override feature allows a crewmember to manipulate the positive pressure relief valve 100 to equalize the pressure between an enclosed volume and another enclosed volume (e.g., between modules of the International Space Station). To operate the inlet manual override knob 101 and outlet manual override knob 110, the crewmember may push or pull the knob (as the case may be, depending on the knob) relative to the positive pressure relief valve 100 and to selectively turn the knob between a "normal" position and an "override" position. When the crewmember pushes (or pulls) the knob, the knob causes (via one or more grooves/channels and pins) the internal main piston 208 to overcome the piston spring 702 and unseat itself from the edge of the valve throat (e.g., the internal channel through which the fluid can pass between the inlet 242 to the outlet), thereby achieving an open (venting) position. In certain aspects, the position of the main piston 208 can be locked in place by turning the knob 101, 110 to the override position. The inlet and exit knobs 101, 110 are configured to operate independently of each other; however each override knob 101, 110 should be in the "normal" position for the positive pressure relief valve 100 to operate automatically/normally.

FIGS. 2a through 2d illustrate cross-sectional views of the positive pressure relief valve 100 with an example valve internal assembly 104. As illustrated, the valve assembly 104 generally comprises an inlet housing 202 to define an inlet 242 along its circumference, a mounting bracket 204, an exit housing 206 to define an outlet along its circumference, a main piston 208, a set of throat inserts 210, a plurality of main fasteners 212 (each with a washer 214, such as a split lock washer), a valve seal 216, an interface seal 218, and a screening material 220 (e.g., a wire mesh) at the inlet 242 of the inlet housing 202 to prevent debris from entering the positive pressure relief valve 100. The valve seal 216 is used to seal the valve when it is installed. Also included is a main piston cap 230 that interfaces to a convoluted main piston diaphragm 232. The main piston cap 230 and main piston diaphragm 232 are secured to the piston rod 604 at its secondary end using, for example, a clamp 234 and a plurality of nuts 236 and fasteners 238. The main piston diaphragm 232 defines a cavity behind the main piston 208 that can be pressurized by the trigger mechanism 800 to force the main piston 208 to move, thereby open a fluid flow path between the inlet 242 and the outlet. While not illustrated, a screening material may also be provided at the outlet 244 to prevent debris from entering the positive pressure relief valve 100 via the outlet 244, which may provide useful where fluid can travel from the outlet 244 to the inlet, such as the case of a manual override condition where a crewmember wishes to equalize the pressure between an enclosed volume and another enclosed volume.

As will be explained below, the positive pressure relief valve 100 may be fabricated primarily from an aluminum alloy (e.g., Aluminum Alloy 7075-T7351) and assembled using National Aerospace Standards (NAS) fasteners. The positive pressure relief valve 100 may be coupled to a spacecraft structure 226 (e.g., a port, door, interior wall, fuselage, etc.) that divides the enclosed volume from another volume/space via the mounting bracket 204 and a plurality of main fasteners 212. The piston spring 702 is configured to bias the main piston 208 and the override knob 101 (where applicable) in a closed position. One or more fasteners 116 may be used to couple the inlet housing 202 and the exit housing 206 to the mounting bracket 204. Similarly, the inlet end plate 102 and the exit end plate 108 may be coupled to, respectively, the inlet housing 202 and the trigger mechanism housing 106 via a plurality of fasteners 112.

In certain aspects, a specific flowrate may be required (or simply desired) when venting fluid from the inlet 242 to the outlet 244 through the valve throat 250 (e.g., the fluid channel define between the inlet 242 to the outlet 244) of the positive pressure relief valve 100. To adjust the flowrate, the diameter (and, therefore, volume) of the valve throat, which defines the flow area, may be increased (to increase flowrate) or decreased (to decrease flowrate). That is, there exists a direct correlation between flowrate and valve throat volume/diameter. Adjusting the size of the valve throat for each use, however, would require that the throat 228 of the mounting bracket 204 and the throat 502 of the exit housing 206 be resized or otherwise reconfigured, which could result in expensive tooling and time costs. Moreover, depending on the desired flowrate, the inner diameter of the piston 604 may need to be sized smaller than the diameter of one or both of the piston ends 602, 606, thereby necessitating a modular main piston 208 having one or more detachable piston caps 230 to allow the piston to pass through the valve throat, which increases cost, weight, and complexity of the main piston 208.

Figure 3B:
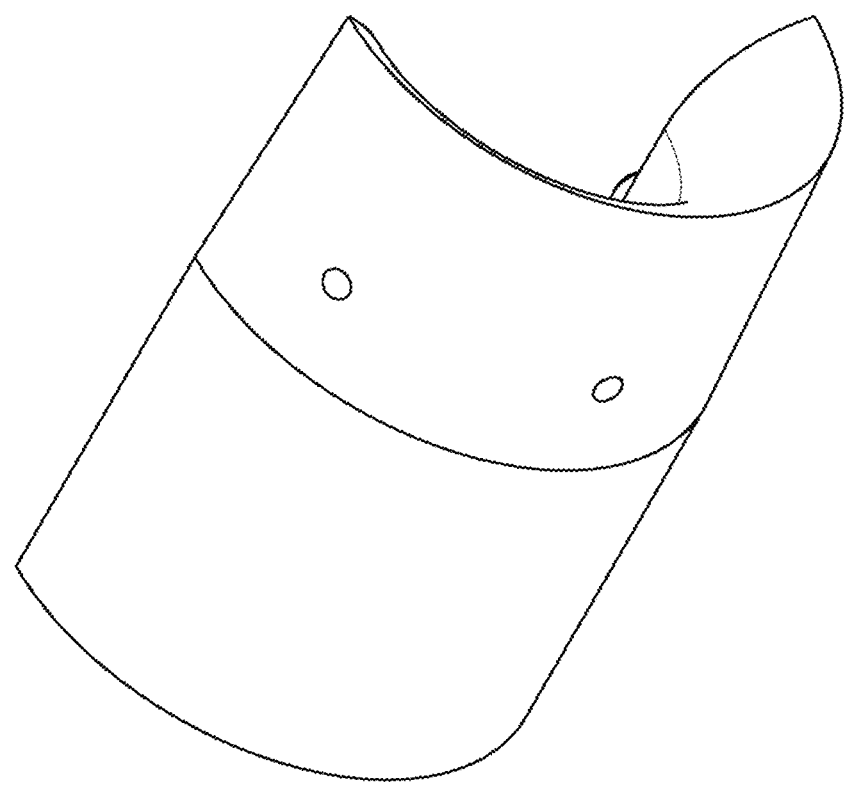
FIGS. 3a and 3b illustrate an example set of throat inserts.
Figure 3A:
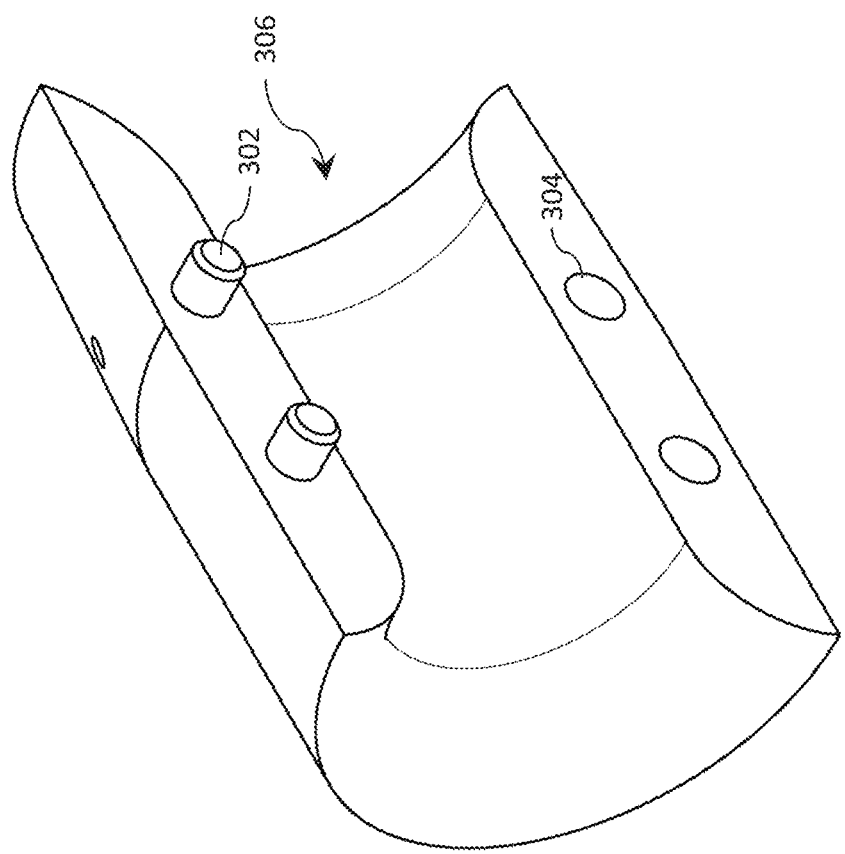

To avoid these issues, a set of throat inserts 210 may be inserted into the piston cavity (e.g., the valve throat defined by the mounting bracket 204 and the exit housing 206) to adjust the overall volume and, therefore, flowrate. The set of throat inserts 210 may be interchangeable to allow for reuse of the positive pressure relief valve 100 in various applications, regardless of different flowrate needs. As example throat insert 210 is illustrated in FIGS. 3a and 3b. Each of the throat inserts 210 in a set may be substantially identical, but mirrored and having tabs 302 configured to mate with corresponding holes 304 to define a tubular insert with a throat 306 passing therethrough. The tabs 302 may be, for example, 0.125 inch diameter pins with an ultimate shear strength of at least 38 ksi. The set of throat inserts 210 may be secured within the valve throat of the positive pressure relief valve 100 using, for example, fasteners. The set of throat inserts 210 may be sized to achieve a predetermined flowrate. In other words, the set of throat inserts 210 can be used to adjust flowrate without requiring replacement or changes to the other components of the positive pressure relief valve 100. By way of illustration, to comply with the specific use requirements, the throat inserts 210 can serve to reduce the maximum flow through the positive pressure relief valve 100 from, for example, 0.36 lb/s (without throat inserts 210) to, for example, 0.12 lb/s (with throat inserts 210) at 15.9 psid. The outer surface of the tubular insert defined by the set of throat inserts 210 may be sized and shaped to conform to the inner surface of the valve throat defined by the mounting bracket 204 and the exit housing 206.

With reference to FIGS. 2c and 2d, the valve assembly 104 of the positive pressure relief valve 100 is illustrated in a closed position (FIG. 2c) and an open position (FIG. 2d). In the closed position, the main piston 208 is biased toward the distal end of the positive pressure relief valve 100 via a piston spring 702 to form a seal between the primary piston end 602 of the main piston 208 and a surface adjacent the valve throat of the mounting bracket 204. As illustrated, the set of main seals 222 (e.g., double-lobed molded-in-place elastomer, O-ring(s), etc.) may be positioned on the mounting bracket 204 around the opening to the throat 228 to maintain a fluid-tight seal between the primary piston end 602 and the mounting bracket 204. The main seals 222 may be fabricated from, for example, a fluorosilicone elastomer. In the open position, a high pressure fluid overcomes of the force of the piston spring 702, thereby causing the main piston 208 to translate along the Z-axis toward the proximal end. As illustrated, when the main piston 208 translates toward the proximal end, the fluid-tight seal between the primary piston end 602 and the mounting bracket 204 is broken to allow fluid to pass, as indicated by the broken-line arrows, from the inlet, through the valve throat of the positive pressure relief valve 100, and out via the outlet.

Figure 4B:
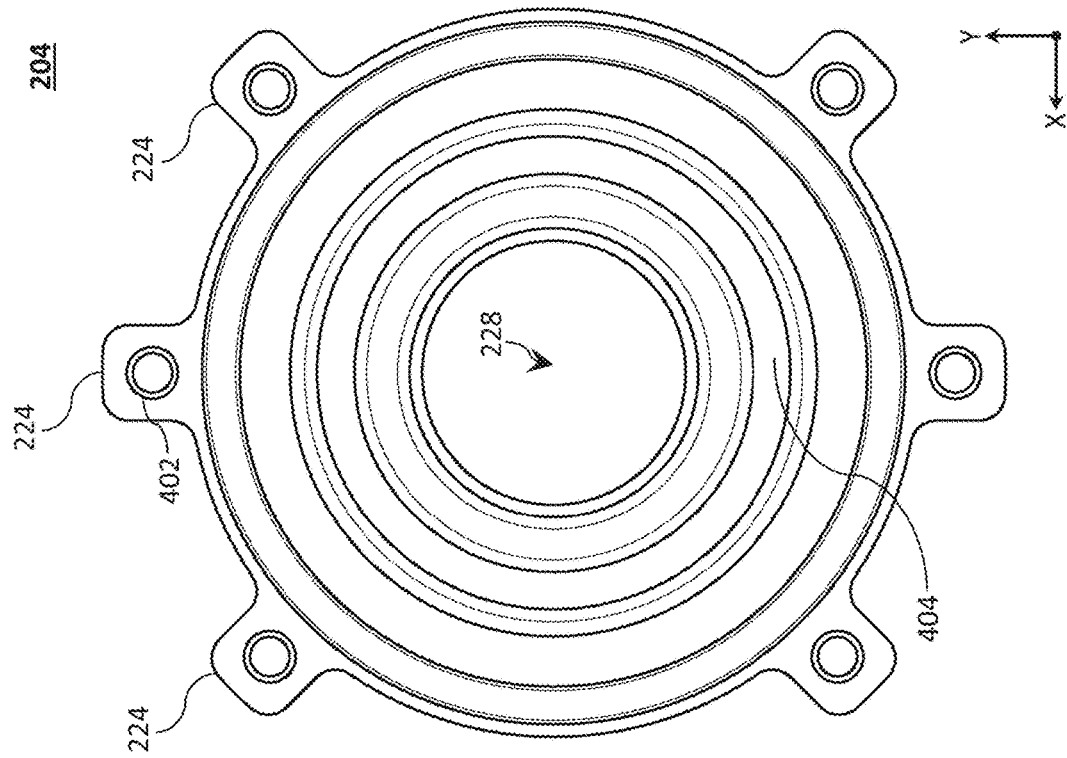
FIGS. 4a through 4b illustrates an example mounting bracket.
Figure 4A:
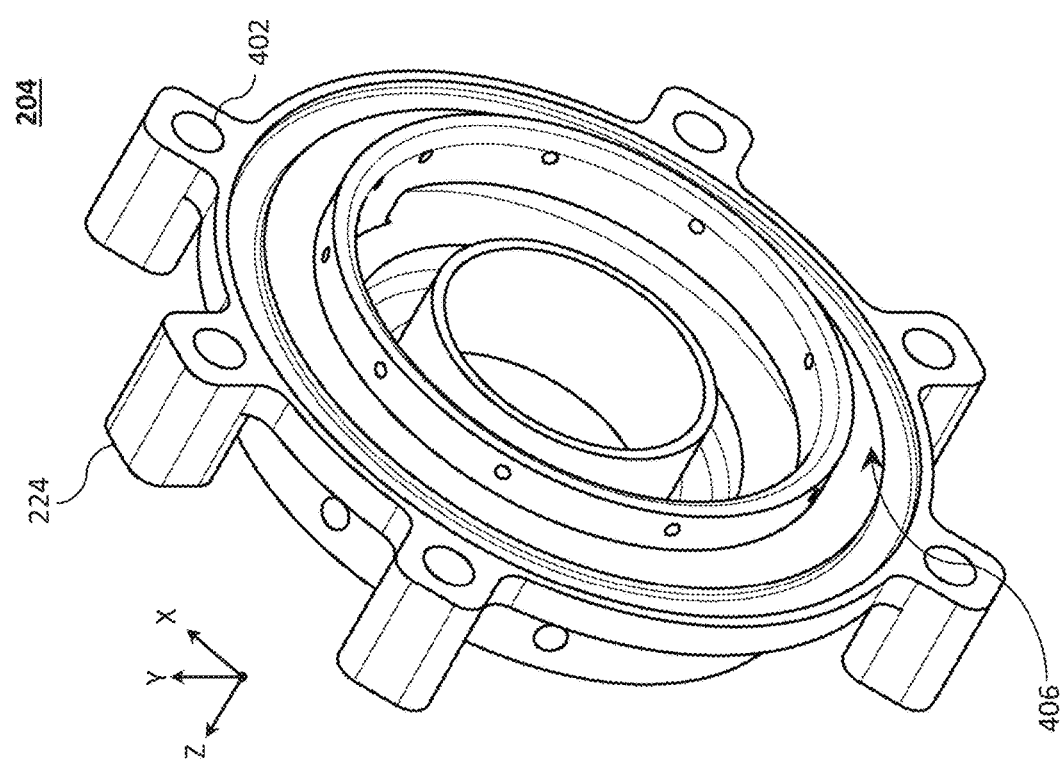
Figure 4C:
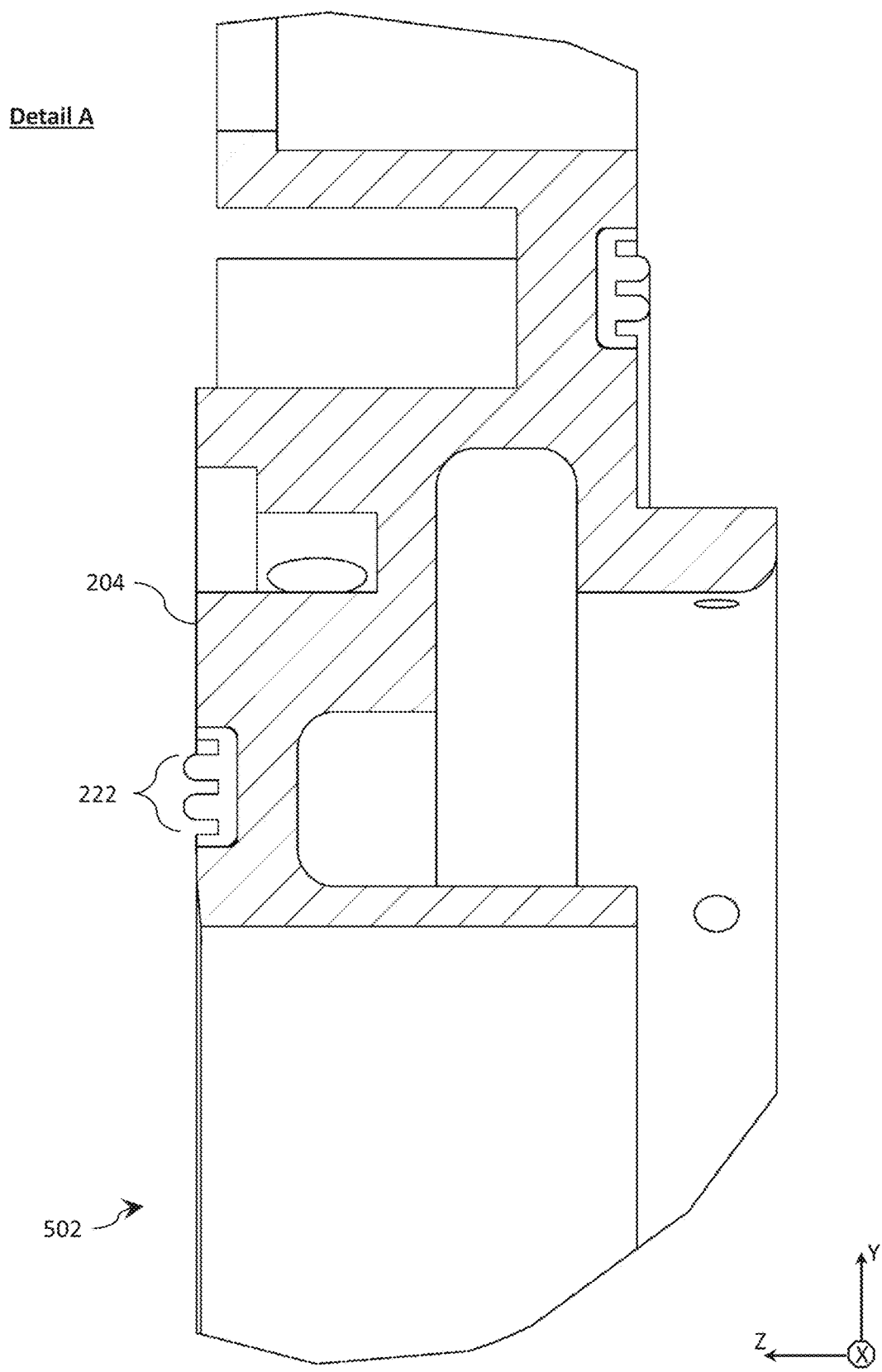
FIG. 4c illustrates Detail A of FIG. 2b.

FIGS. 4a through 4c illustrate an enlargement of the an example mounting bracket 204. As illustrated, the mounting bracket 204 is generally circular and shaped to define a first throat 228 through which fluid may pass to achieve venting. As best illustrated in FIG. 4b, the mounting bracket 204 may include a plurality of mounting flanges 224 (e.g., 2 to 10, or, as illustrated, 6); each configured to receive a main fastener 212 via a mounting hole 402. Each of the main fasteners 212 may pass through a mounting hole 402 of a mounting flange 224 and into corresponding threads of the spacecraft structure 226 (or component thereof). While the mounting flanges 224 are illustrated as grouped into two sets of three, the mounting flanges 224 may instead be equally distributed along the outer perimeter of the mounting bracket 204. As can be appreciated, the mounting flanges 224 may be arranged to aligned with a predetermined bolt pattern on the spacecraft.

The set of main seals 222 may be positioned within a first circular channel 404 on the front side of the mounting bracket 204. The mounting interface seal 218 (e.g., double-lobed molded-in-place elastomer, a set of concentric O-rings, etc.) may be positioned within a second circular channel 406 on the back side of the mounting bracket 204 to form an airtight seal between the mounting bracket 204 and the spacecraft structure 226. To prevent the main fasteners 212 from loosening (e.g., due to vibration), one or more washers 214 (or lock washers) may be provided at and between each main fastener 212 and mounting flange 224. As best illustrated in Detail A of FIG. 4c, a chamfer may be added to the edge around the throat 228 (e.g., adjacent the first circular channel 404). The chamfer may be approximately 0.05 to 0.10 inches, more preferably, approximately 0.075 inches around the throat 228 at an angle of, for example, 1 to 10 degrees, more preferably approximately 5 degrees. An advantage of a chamfer of approximately 5 degrees is that it can provide a smooth flow surface when the throat inserts are installed. For example, if the throat insert (e.g., throat inserts 210) is changed to achieve a different desired flowrate, then this angle might be adjusted to better suit the new insert.

Figure 5:
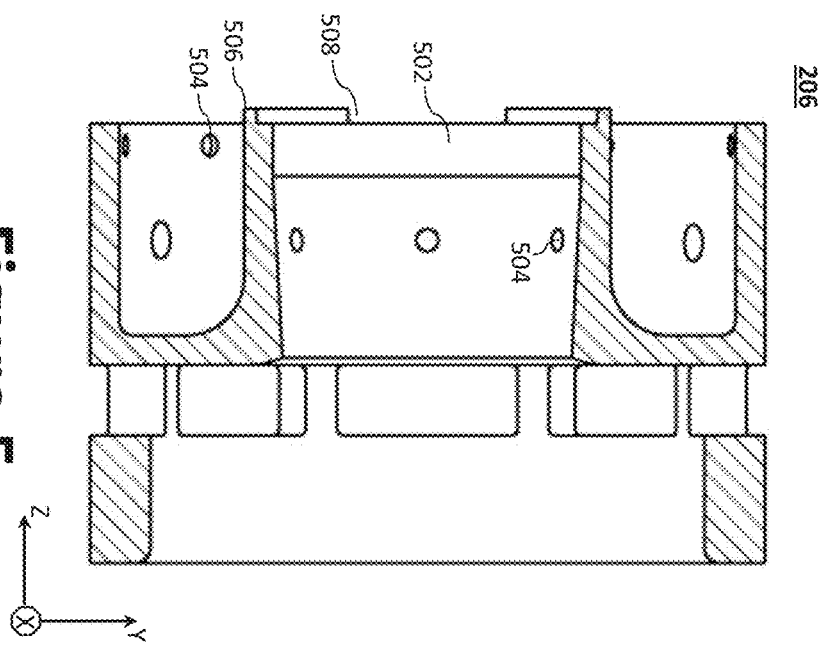
FIG. 5 illustrates a cross section of an example exit housing.

FIG. 5 illustrates an example exit housing 206. The exit housing 206 may be generally circular and shaped to define a throat 502 at its center. The narrower end of the throat 502 may be rounded. As illustrated, the exit housing 206 may include a plurality of holes 504 to facilitate assembly of the positive pressure relief valve 100 using one or more fasteners (e.g., fasteners 116, as illustrated in FIG. 1f). The holes 504 positioned in the conical portion of the throat 502 may use fasteners that secure the throat inserts 210 when installed, which may be a different size than the other holes, such as those configured to receive fasteners that secure the exit housing to the mounting bracket. As illustrated, the proximal end of the second throat portion 508 may include a lip 506 that is sized and shaped to couple with the distal end of the first throat 228 defined by the mounting bracket 204. Therefore, the valve throat of the positive pressure relief valve 100 can be generally defined by the combination of the first throat 228 and the second throat portion 508. The valve throat of the positive pressure relief valve 100, however, may be modified using the throat inserts 210, as described above.

Figure 6:
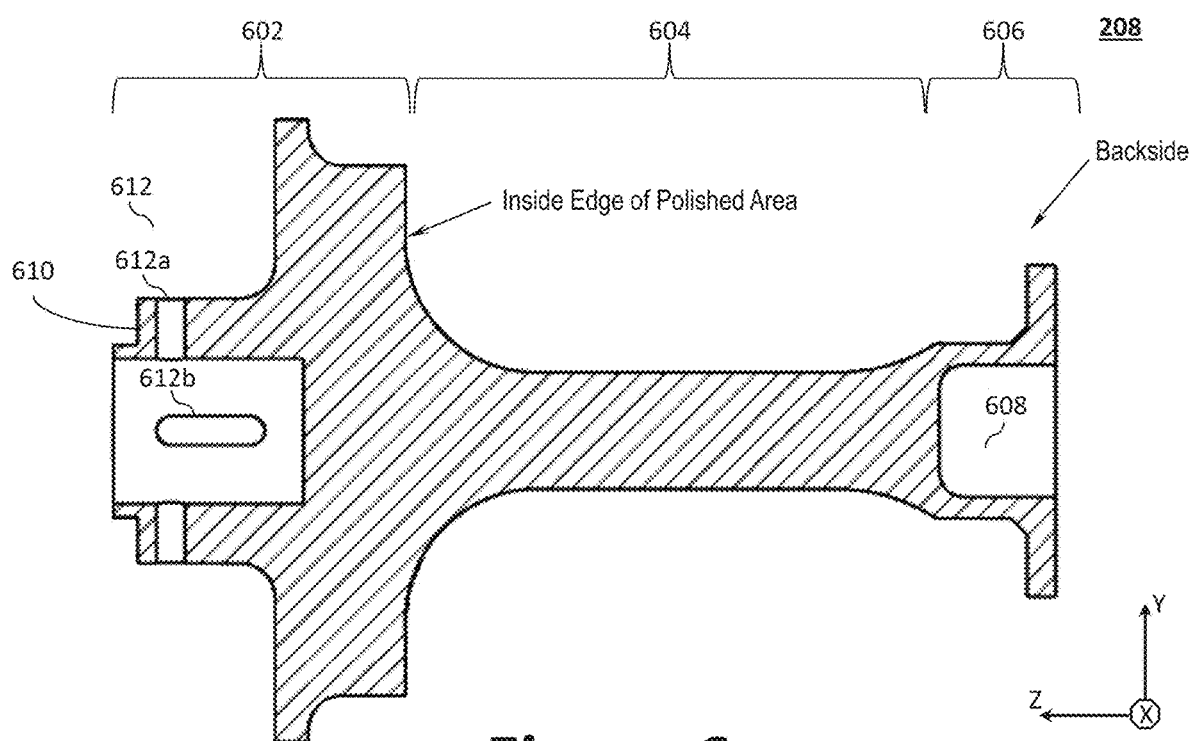
FIG. 6 illustrates a cross section of an example main piston.

FIG. 6 illustrates an example main piston 208 with example measurements. As illustrated, the main piston 208 generally comprises a primary piston end 602, a piston rod 604, and a secondary piston end 606. The main piston 208 generally resides within the valve throat of the positive pressure relief valve 100. The piston rod 604 couples the primary piston end 602 to the secondary piston end 606. The outer diameter of the primary piston end 602 may taper and level off. The piston rod 604 couples to back side of the primary piston end 602 and tapers for a majority of its longitudinal length, before tapering back up so as to couple with the secondary piston end 606. Rather than tapering, the two outer diameters may be parallel, but include a chamfer at the point where the smaller outer diameter adjoins (or otherwise couples to) the larger outer diameter.

Figure 7:
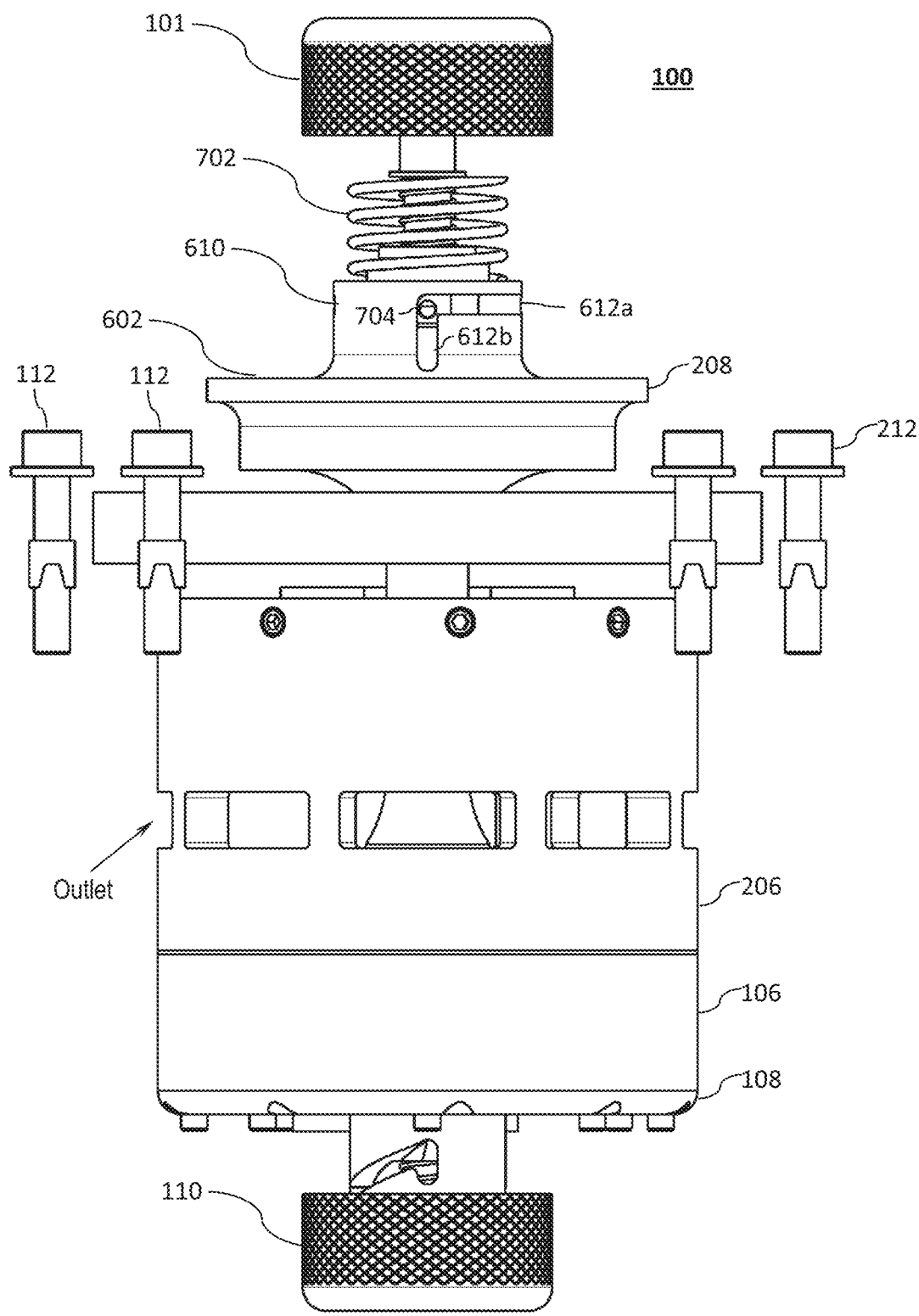
FIG. 7 illustrates an inlet housing having a manual override assembly with the inlet housing removed for illustrative purposes.

As illustrated, the primary piston end 602 comprises a cylindrical portion 610 having a set of symmetrical slots 612 to engage the inlet manual override knob 101 via a set of custom dowel pins 704. The symmetrical slots 612 generally comprise a lateral portion 612a and a longitudinal portion 612b to define, as best illustrated in FIG. 7, an L shape slot to receive the dowel pin(s) 704. Each of dowel pins 704 may be sized and shaped to travel within one of the set of symmetrical slots 612. As illustrated in FIG. 7, when the inlet manual override knob 101 is activated (e.g., actuated by the crewmember through a pulling motion), the dowel pins 704 exert a bearing force on the symmetrical slots 612, thereby causing the main piston 208 to translate along the Z-axis toward the proximal end to open the positive pressure relief valve 100 to vent the enclose space having a higher pressure. For illustrative purposes, the inlet housing 202 is not illustrated in FIG. 7. A piston spring 702 may be provided to bias the primary piston end 602 toward the distal end of valve assembly 104 (along the Z-axis). Therefore, to mitigate risk of inadvertent override, the crewmember must overcome the force of the piston spring 702 by pulling the inlet manual override knob 101 to override the positive pressure relief valve 100. The outlet manual override knob 110 may function in substantially the same manner; however, the outlet manual override knob 110 may couple to the secondary piston end 606 instead of the primary piston end 602, which would require that the crewmember push and turn the outlet manual override knob 110 (instead of pulling and turning). The outlet manual override knob 110 may be configured to couple to the main piston 208 via the surfaces defining the bore 608. The outlet manual override knob 110 may be biased away from the main piston 208 via bias knob spring 240 to avoid unwanted/inadvertent venting of the positive pressure relief valve 100.

Figure 8A:
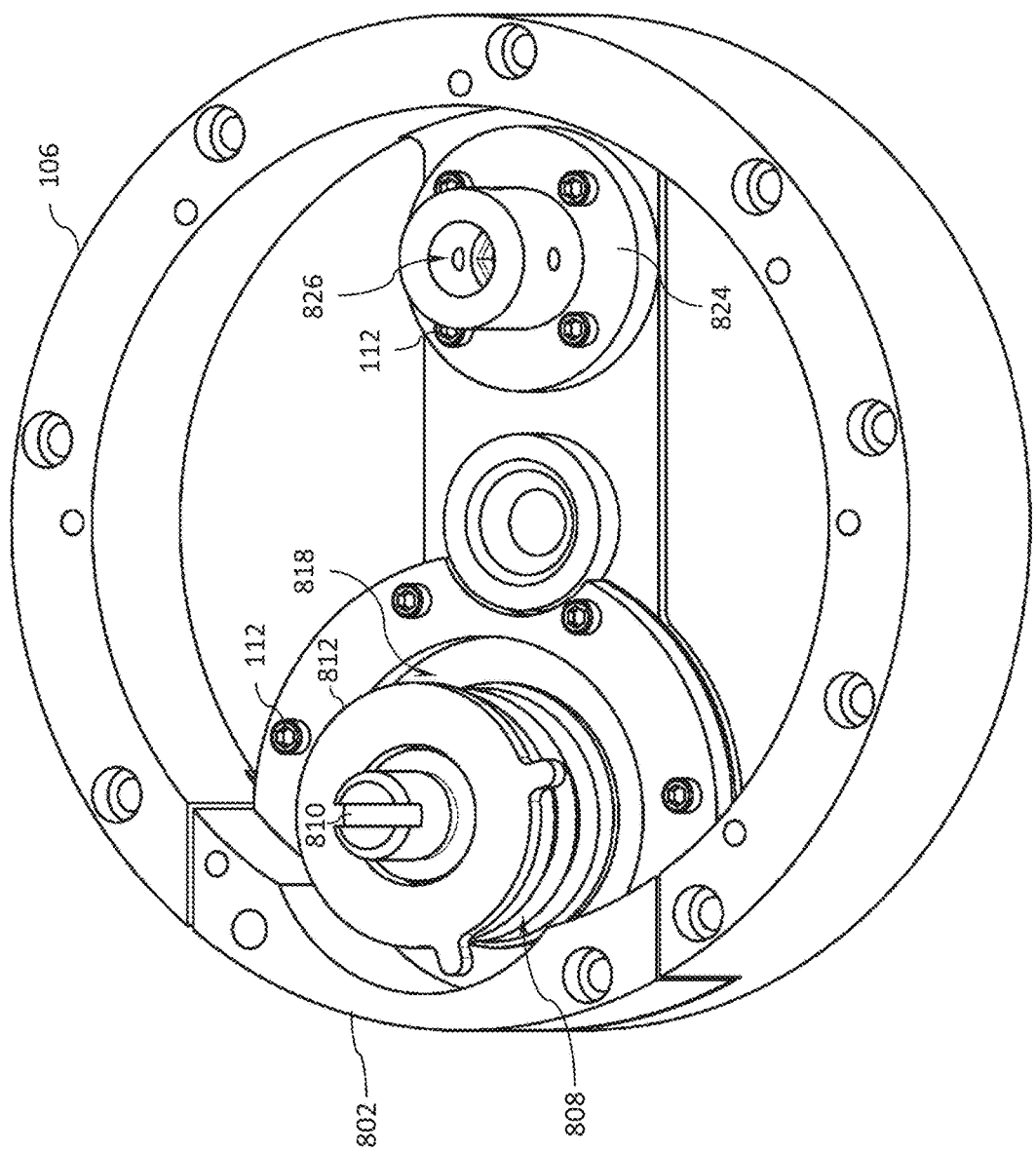
FIGS. 8a through 8c illustrate an example trigger mechanism positioned at the outlet end of the example positive pressure relief valve.
Figure 8B:
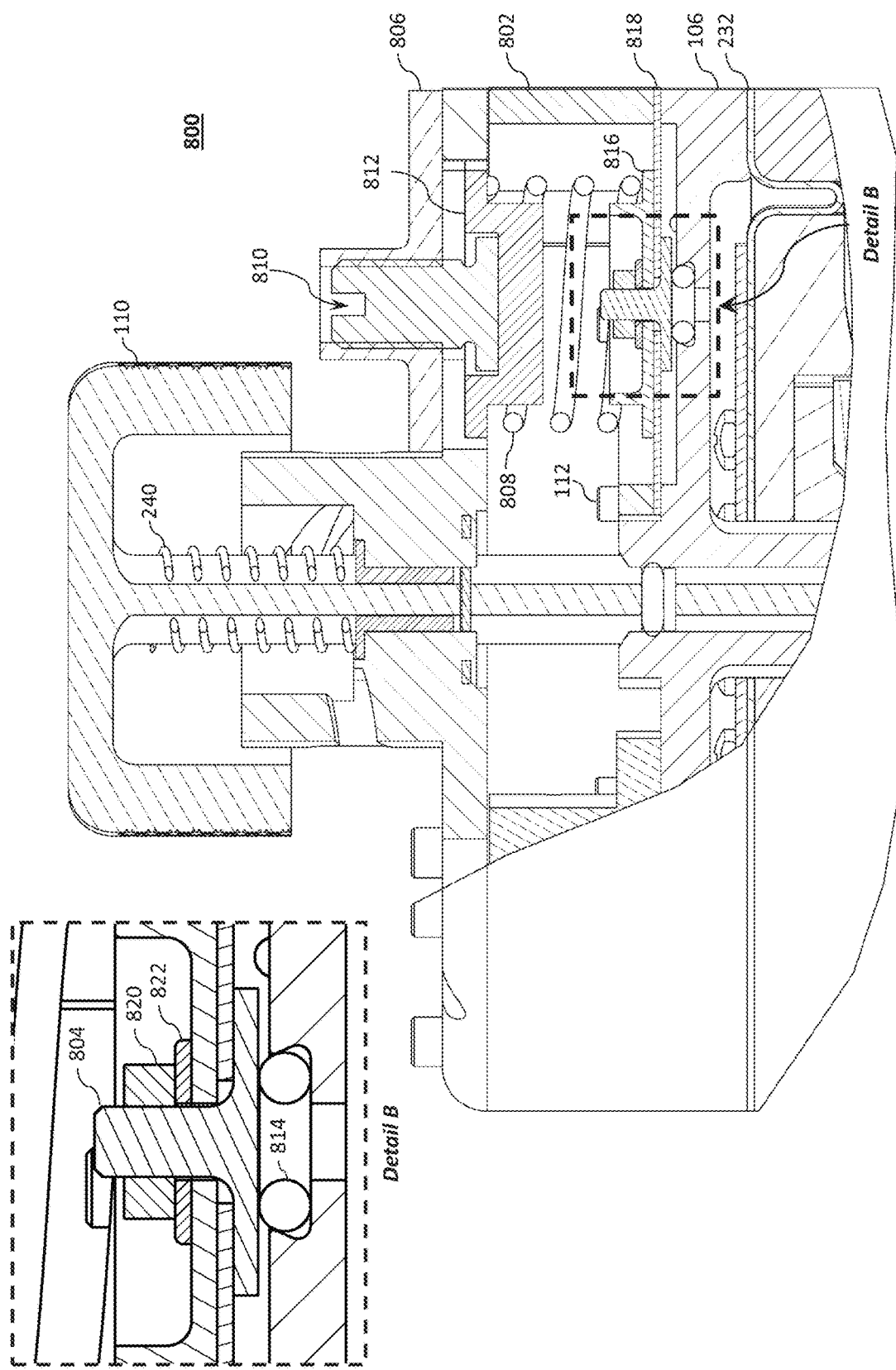
Figure 8C:
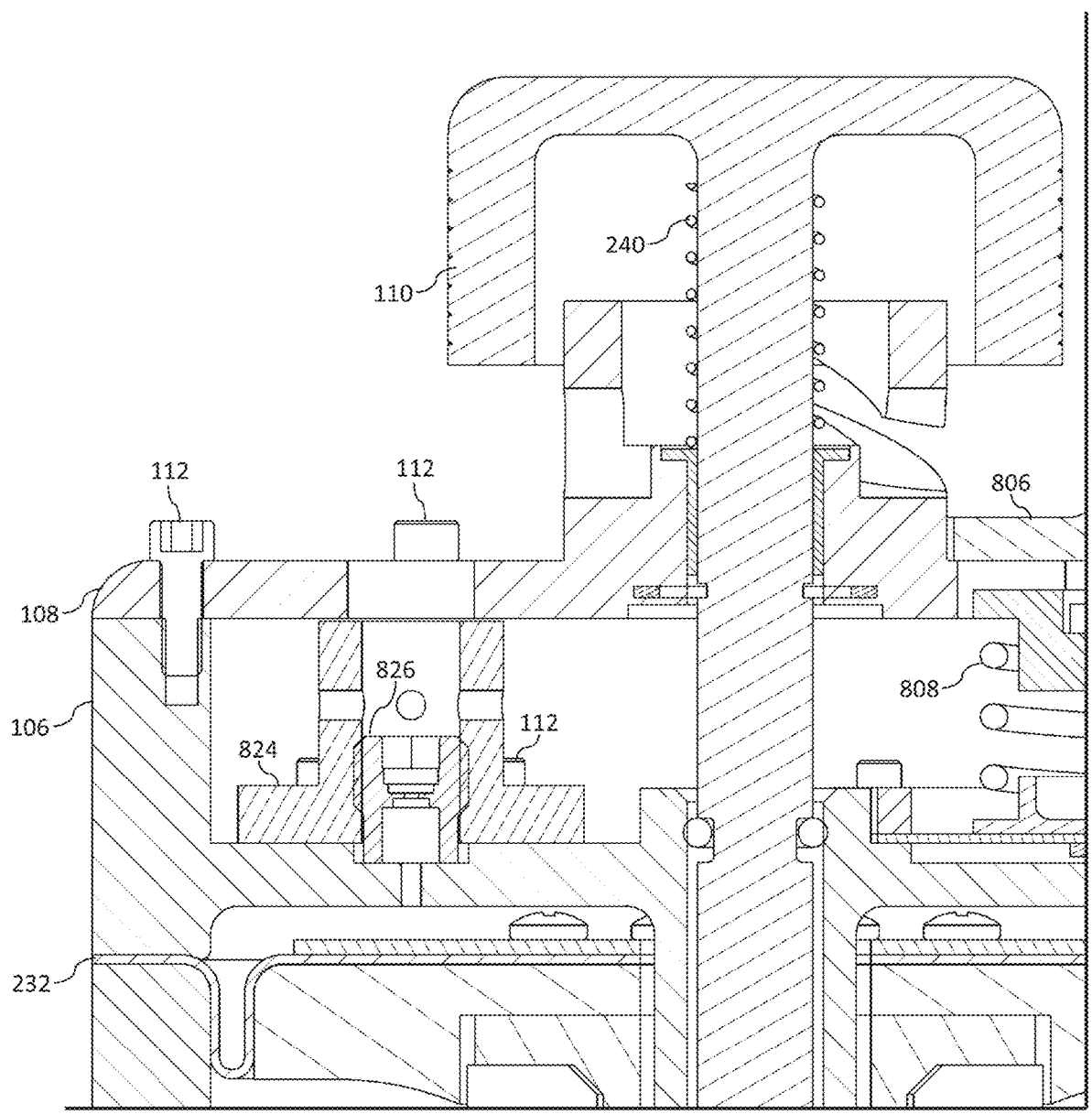
Figure 9B:
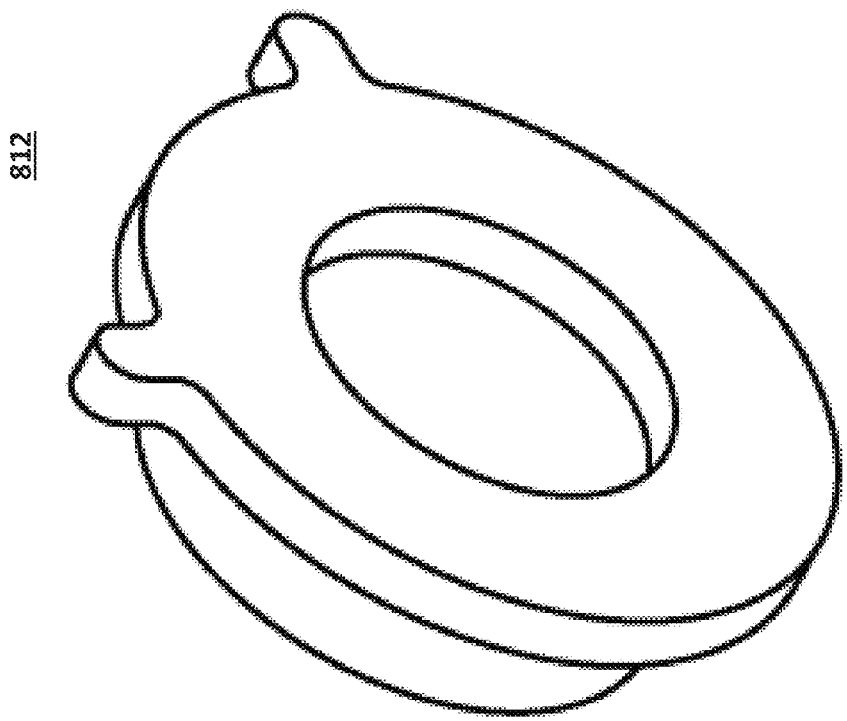
Figure 9A:
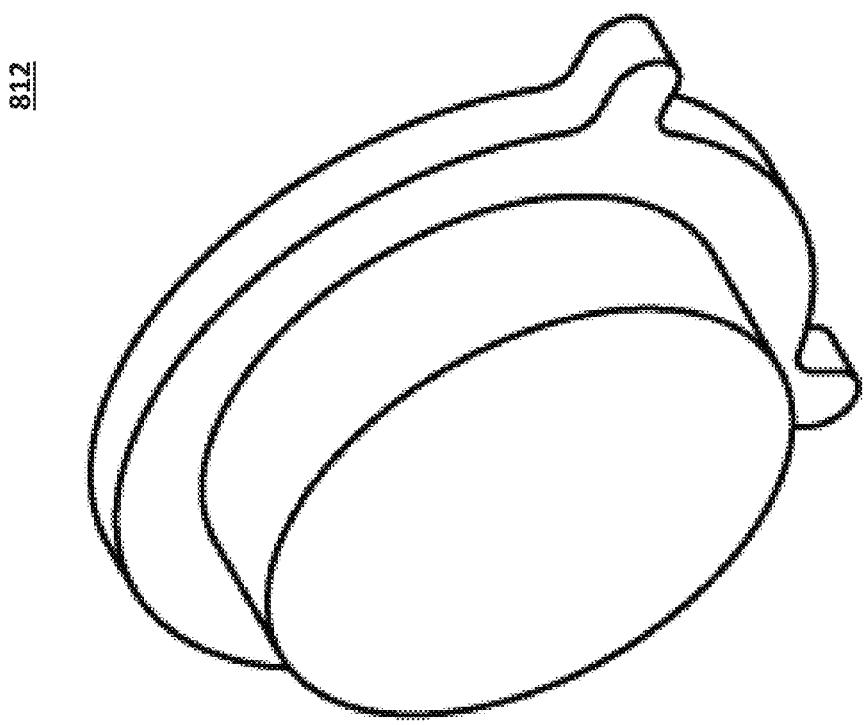

FIGS. 8a through 8c illustrate different views of an example trigger mechanism 800. As illustrated, the trigger mechanism housing 106 may include a trigger diaphragm clamp 802 (which can be secured to the trigger mechanism housing 106 via a plurality of fasteners 112), a trigger piston 804, a trigger spring cover 806, a trigger spring 808, a trigger set screw 810, a trigger spring plug 812, an O-ring 814, a trigger plate 816, and/or a trigger diaphragm 818. The trigger diaphragm 818 can be secured to the trigger piston 804 using a washer 822 and a nut 820. The trigger mechanism 800 further includes a vent housing 824 (which may be secured to the trigger mechanism housing 106 via a plurality of fasteners 112) and a flow-calibrated vent orifice 826. The vent orifice 826 provides a controlled evacuation of the cavity adjacent to the main piston diaphragm 232. FIGS. 9a through 9e illustrate an example trigger spring plug 812 to provide the interface between the trigger set screw 810 and the trigger spring 808, thereby allowing for adjustment of the amount of compression of the trigger spring 808 and therefore the amount of force keeping the trigger piston 804 seated against the trigger O-ring 814.

In operation, for differential pressures below 14.5 psid, the backside of the main piston 208 is vented to the outside via the vent orifice 826. The pressure differential across the top surface and the force provided by the piston spring 702 provides a seal force adequate to compress the main seals 222 (e.g., by more than 20% of their thickness). When the internal pressure exceeds approximately 14.65 psid, the trigger piston 804 unseats itself from its O-ring 814 and opens the pressurization hole. Initially the flow through the trigger O-ring 814 is small enough that the pressure loss is comparable to the pressure loss through the vent orifice 826. At this point the pressure on the backside of the main piston 208 is below the value needed to open/unseat the main piston 208 and the main valve (throat) is still closed/sealed (FIG. 2c). However, at a slightly higher pressure differential (approximately 14.75 psid), the trigger 804 may move further away from the trigger O-ring 814 and the pressure loss across the O-ring/pressurization hole is negligible compared to the pressure loss across the vent orifice 824. At this point the backside of the main piston 208 is pressurized to the internal pressure of the trigger mechanism housing 106 and the main piston 208 will unseat itself to open the throat 502 (FIG. 2d). In certain aspects, a trigger set screw 810 can be provided to ultimately adjust and/or set the opening point of the main piston 208 (e.g., the pressure at which point the trigger piston 804 unseats itself to supply pressure to unseat the main piston 208, thereby opening the valve throat 502). Once the backside of the main piston 208 is pressurized, the force on the backside from the main piston diaphragm 232 exceeds the combined pressure and spring force of the piston spring on the top of the main piston 208 and the main piston 208 translates upwards (along the Z-axis, toward the proximal end) to relieve the pressure buildup. In certain aspects, the positive pressure relief valve 100 may fully open at 15.2 psid. Once the pressure drops below the crack pressure, the trigger piston 804 first re-seats itself against the trigger O-ring 814, and the backside of the main piston 208 "bleeds-off" through the permanent vent orifice 824 to allow the main piston 208 to return to its seated/closed position (FIG. 2c). The bleed-off process allows the closure of the main piston 208.

In one aspect, the positive pressure relief valve 100 may be configured to open at 15.05±0.05 psi, to fully open by 15.2 psi (providing a flowrate of 0.25 lbm/sec), and to reseat by 14.7 psi to meet a predetermined leakage requirement (e.g., a leakage of ≤2×10-02 scc/sec Helium at 14.7 psid). The operating pressure range of the positive pressure relief valve 100 may be, for example, 2×10-02 to 15.2 psia, with an operating temperature range of −30 to +150° F. (e.g., for use on the International Space Station) or +40 to +125° F. (e.g., for use on pressurized cargo modules (PCM)).

To facilitate use in space, the positive pressure relief valve 100 (and components thereof) may be fabricated from A-Basis materials. For example, a majority of the positive pressure relief valve's 100 components may be fabricated from an aluminum alloy (e.g., 7075-T73, 7075-T7351, 6061, etc.) due to its high strength, low weight, and resistance to stress corrosion cracking (SCC). Further, the aluminum alloy components may be configured meet ASTM B209, B211, or B221 specifications, while the stainless steel parts may be Type 303 per ASTM A582. Example suitable materials are provided in Table A, along with some of their properties.

TABLE A

| Material | Yield Strength $\sigma_y$ [ksi] | Ultimate Strength $\sigma_u$ [ksi] | Young's Modulus E [Msi] | Poisson's Ratio v [—] | Density $\rho$ [lb/in$^3$] |
| --- | --- | --- | --- | --- | --- |
| Torlon 4540 | 13 | 13 | 0.68 | 0.42 | 0.053 |
| Aluminum 7075-T7351 | 55 | 66 | 10.3 | 0.33 | 0.101 |
| Aluminum 6061-T6 | 36 | 42 | 9.9 | 0.33 | 0.098 |
| Stainless Steel 302 Full Hard | 137 | 174 | 26.0 | 0.27 | 0.286 |
| Stainless Steel PH17-5MO | 165 | 185 | 29.0 | 0.28 | 0.0277 |

The various components may be coupled together using one or more fasteners (e.g., bolts, screws, etc.). The positive pressure relief valve 100 fasteners may be fabricated per NAS, such as NAS1189, NAS1190, NAS1351, and/or NAS1352 standards. In certain aspects, the fasteners may be stainless steel having an ultimate tensile strength of at least 180 ksi, an ultimate shear strength of at least 95 ksi, and a yield tensile strength of at least 107 ksi. The fasteners may also be heat resistant steel, which exhibits an ultimate tensile strength of at least 180 ksi, an ultimate shear strength is at least 108 ksi, and a yield strength of at least 160 ksi. Fastener design properties, including installation torque values and tensile and shear areas, are shown in Table B for the various fastener sizes. Additionally, the positive pressure relief valve's 100 threads 236. The torque applied to the cap is consistent with the maximum torque a 95$^{th}$ percentile male can exert. The torque variability percent is due to the accuracy of the torque wrench. Table B provides a fastener property summary.

TABLE B

| Fastener | Major Diameter d [in] | Pitch Diameter e [in] | Head Inner Radius $r_i$ [in] | Head Outer Radius $r_o$ [in] | Torque T [in-lb] | Tensile Area $A_t$ [in$^2$] | Shear Area $A_s$ [in$^2$] | Lead Angle α [°] | Half Angle β [°] |
|---|---|---|---|---|---|---|---|---|---|
| Fastener 1 × 12 | 0.0600 | 0.0519 | 0.0325 | 0.0480 | 0.5 ± 6% | 0.00180 | 0.00231 | 4.38 | 30 |
| Fastener 1 × 14 | 0.0860 | 0.0744 | 0.0455 | 0.0700 | 2.5 ± 6% | 0.00370 | 0.00475 | 4.37 | 30 |
| Fastener 2 × 12 | 0.1900 | 0.1697 | 0.0975 | 0.1560 | 76 ± 2 ± 6% | 0.0200 | 0.0242 | 3.35 | 30 |
| Threads 236 | 3.0000 | 2.9659 | N/A | N/A | 71.8 | N/A | N/A | 0.30 | 30 |
| 0.125" Pin (Tab 302) | 0.12500 | N/A | N/A | N/A | N/A | N/A | 0.0120 | N/A | N/A |

The fasteners 112, 114 have a preload uncertainty, F, of ±35%, consistent with torque-measurement of unlubricated bolts. The fasteners 212 have a preload uncertainty, F, of ±10% to prevent the maximum fastener preload from exceeding the tensile yield and ultimate strengths. All fastener interfaces are stainless steel-to-aluminum, alcohol cleaned and unlubricated, with a coefficient of friction of 0.11. The engagement length should be at least the major diameter of the fastener. All fasteners may be class 3A and all tapped holes are 2B, with equivalent unified threading properties used for the calculation of thread shear area. The fasteners 212 may be threaded through steel alloy inserts on the spacecraft structure 226. Finally, the positive pressure relief valve 100 cap load factor may be set at unity for conservatism. Additional calculated joint properties are listed in Table C.

It can be seen from the tables above that the maximum fastener preload for fastener 212 exceeds the tensile yield and ultimate strengths. Therefore, when the positive pressure relief valve 100 is installed onto the spacecraft, an alternate method of preload measurement be used such that the torque uncertainty is ±10% or less.

Although various embodiments have been described with reference to a particular arrangement of parts, features, and like, these are not intended to exhaust all possible arrangements or features, and indeed many other embodiments, modifications, and variations can be ascertainable to those of skill in the art. Thus, it is to be understood that the disclosure may therefore be practiced otherwise than as specifically described above.

TABLE C

| Fastener | Effective Bearing Radius $r_e$ [in] | Effective Thread Radius $r_t$ [in] | Nut Factor K [—] | Load Factor Φ [—] | Maximum Preload $P_{preload, max}$ [lbf] | Minimum Preload $P_{preload, min}$ [lbf] | External Thread Shear Area $A_{se}$ [in$^2$] | Internal Thread Shear Area $A_{si}$ [in$^2$] |
|---|---|---|---|---|---|---|---|---|
| Fastener 1 × 12 | 0.0403 | 0.0260 | 0.16 | 0.67 | 73.7 | 27.8 | 0.0045 | 0.0066 |
| Fastener 1 × 14 | 0.0578 | 0.0372 | 0.16 | 0.67 | 257.0 | 96.9 | 0.0094 | 0.0144 |
| Fastener 2 × 12 | 0.1268 | 0.0849 | 0.16 | 0.44 | 2985.05 | 2016.57 | 0.0548 | 0.0760 |
| Threads 236 | N/A | 1.4830 | 0.07 | 1.00 | 494.2 | N/A | 0.5835 | 0.8060 |
| 0.125" Pin (Tab 302) | N/A | N/A | N/A | N/A | N/A | N/A | N/A | N/A |

The calculated fastener strengths are listed in Table D. The fastener thread shear strengths are based on alloy steel. The component thread shear strengths of the positive pressure relief valve 100 are based on Aluminum 7075-T7351.

TABLE D

| Fastener | Tensile Yield Strength $F_{ty}$ [lbf] | Tensile Ultimate Strength $F_{tu}$ [lbf] | Shear Ultimate Strength $F_{su}$ [lbf] | Fastener External Thread Shear Strength $F_{se}$ [lbf] | Component Internal Thread Shear Strength $F_{si}$ [lbf] |
|---|---|---|---|---|---|
| Fastener 1 × 12 | 192.6 | 324.0 | 219.5 | 426.7 | 252.6 |
| Fastener 1 × 14 | 395.9 | 666.0 | 451.3 | 892.8 | 548.2 |
| Fastener 2 × 12 | 3200.0 | 3600.0 | 2299 | 5205.1 | N/A |
| Threads 236 | N/A | N/A | N/A | 22172 | 30630 |
| 0.125" Pin (Tab 302) | N/A | N/A | 456 | N/A | N/A |

What is claimed is:

1. A positive pressure relief valve comprising:

a valve assembly defining a valve throat between an inlet at an inlet end and an outlet at an outlet end, wherein the valve assembly comprises a main piston positioned at least partially within the valve throat, the main piston configured to selectively open and close the valve throat as a function of a pressure at the inlet, wherein the valve assembly comprises a set of throat inserts within the valve throat;

a trigger mechanism comprising a trigger piston, wherein the trigger piston is configured to open at a predetermined pressure to pressurize a diaphragm associated with the main piston to open the valve throat as a function of a pressure at the outlet, wherein the trigger mechanism is positioned in a trigger mechanism housing at the outlet end of the valve assembly;

an inlet manual override knob coupled to the main piston, wherein the inlet manual override knob is configured to pull the main piston from the inlet end, wherein pulling the main piston from the inlet end unseats the main piston to vent fluid through the valve throat; and an outlet manual override knob coupled to the main piston, wherein the outlet manual override knob is configured to push the main piston from the outlet end, wherein pushing the main piston from the outlet end unseats the main piston to vent fluid through the valve throat.

2. The positive pressure relief valve of claim 1, wherein the valve assembly comprises an inlet housing, a mounting bracket, and an exit housing.

3. The positive pressure relief valve of claim 2, wherein the inlet housing defines inlet and the exit housing defines the outlet.

4. The positive pressure relief valve of claim 3, wherein the mounting bracket defines a first throat portion and the exit housing defines a second throat portion, the first and second throat portions defining the valve throat.

5. The positive pressure relief valve of claim 4, wherein an outer surface defined by the set of throat inserts is sized and shaped to correspond to an inner surface defined by the valve throat.

6. The positive pressure relief valve of claim 5, wherein the set of throat inserts is sized to reduce flowrate through the valve throat.

7. The positive pressure relief valve of claim 5, wherein the set of throat inserts is interchangeable.

8. The positive pressure relief valve of claim 2, wherein the valve throat tapers from the inlet to the outlet.

9. The positive pressure relief valve of claim 2, wherein a diameter of the valve throat at the outlet end is less than a diameter of the valve throat at the inlet end.

10. The positive pressure relief valve of claim 1, wherein the trigger mechanism comprises a trigger spring to bias the trigger piston in a closed position.

11. The positive pressure relief valve of claim 10, wherein the trigger mechanism comprises a trigger set screw to adjust a pressure at which point the main piston is unseated to open the valve throat.

12. A method of relieving pressure from an enclosed space, the method comprising:
providing a valve assembly defining a valve throat between an inlet at an inlet end and an outlet at an outlet end, the valve assembly comprising a main piston positioned at least partially within the valve throat,
wherein the main piston is configured to unseat at a predetermined pressure at the inlet, and
wherein the valve assembly comprises a set of throat inserts positioned within the valve throat;
providing a trigger mechanism positioned in a trigger mechanism housing at the outlet end of the valve assembly,
wherein the trigger mechanism comprises a trigger piston that is configured to open at a first predetermined pressure to pressurize a diaphragm associated with the main piston to unseat the main piston at a second predetermined pressure at the outlet;
providing an inlet manual override knob that is coupled to the main piston and configured to pull the main piston from the inlet end,
wherein pulling the main piston from the inlet end unseats the main piston to vent fluid through the valve throat; and
providing an outlet manual override knob that is coupled to the main piston and configured to push the main piston from the outlet end,
wherein pushing the main piston from the outlet end unseats the main piston to vent fluid through the valve throat.

13. The method of claim 12, wherein an outer surface defined by the set of throat inserts is sized and shaped to correspond to an inner surface defined by the valve throat.

14. The method of claim 13, wherein the set of throat inserts is removable and interchangeable.

15. The method of claim 12, wherein the trigger mechanism comprises a trigger spring to bias the trigger piston in a closed position.

16. The method of claim 15, wherein the trigger mechanism comprises a trigger set screw to adjust a pressure at which point the main piston is unseated to open the valve throat.

17. The method of claim 12, wherein the set of throat inserts is removable and sized to reduce flowrate through the valve throat.

18. The method of claim 12, wherein the valve assembly comprises an inlet housing, a mounting bracket, and an exit housing.

19. The method of claim 18, wherein the mounting bracket defines a first throat portion and the exit housing defines a second throat portion, the first and second throat portions defining the valve throat.

20. The method of claim 19, wherein the valve throat tapers from the inlet to the outlet.

* * * * *